United States Patent
Ducharme

(10) Patent No.: US 9,641,322 B2
(45) Date of Patent: *May 2, 2017

(54) CONTAINER AGNOSTIC DECRYPTION DEVICE AND METHODS FOR USE THEREWITH

(71) Applicant: ViXS Systems, Inc., Toronto (CA)

(72) Inventor: Paul D. Ducharme, Richmond Hill (CA)

(73) Assignee: ViXS Systems, Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,653

(22) Filed: Feb. 9, 2015

(65) Prior Publication Data

US 2015/0181308 A1 Jun. 25, 2015

Related U.S. Application Data

(63) Continuation of application No. 13/423,981, filed on Mar. 19, 2012, now Pat. No. 9,008,308.

(60) Provisional application No. 61/596,549, filed on Feb. 8, 2012, provisional application No. 61/604,228, filed on Feb. 28, 2012.

(51) Int. Cl.
*H04L 29/06* (2006.01)
*H04L 9/06* (2006.01)
*H04N 21/2347* (2011.01)
*H04N 21/418* (2011.01)
*H04N 21/4405* (2011.01)
*H04L 9/14* (2006.01)
*H04N 21/647* (2011.01)
*H04N 19/176* (2014.01)

(52) U.S. Cl.
CPC ............... *H04L 9/065* (2013.01); *H04L 9/14* (2013.01); *H04N 19/176* (2014.11); *H04N 21/23476* (2013.01); *H04N 21/4181* (2013.01); *H04N 21/44055* (2013.01); *H04N 21/64715* (2013.01); *H04L 2209/24* (2013.01)

(58) Field of Classification Search
CPC ....... H04N 21/23476; H04N 21/64715; H04N 21/4181; H04N 21/44055; H04N 19/176; H04L 9/14; H04L 9/065; H04L 2209/24
USPC ....... 713/160, 193, 189, 162, 171, 178, 150, 713/176, 194, 190, 192; 380/28, 210, 380/285, 217, 201, 200, 239, 263, 30, 44, 380/218, 216
See application file for complete search history.

(56) References Cited

U.S. PATENT DOCUMENTS

| | | | | |
|---|---|---|---|---|
| 4,078,152 A | * | 3/1978 | Tuckerman, III | H04L 9/0637 380/259 |
| 4,229,818 A | * | 10/1980 | Matyas | H04L 9/0637 380/37 |
| 5,512,977 A | * | 4/1996 | Imai | H04N 1/4486 380/51 |

(Continued)

*Primary Examiner* — David García Cervetti
(74) *Attorney, Agent, or Firm* — Garlick & Markison; Bruce E. Stuckman

(57) ABSTRACT

A video processing device for decrypting a compressed video signal includes a key storage device for storing at least one decryption key. An decryption processing device retrieves the at least one decryption key from the key storage device, and decrypts an encrypted elementary bit stream into at least one elementary bit stream, wherein first portions of the encrypted elementary bit stream are encrypted and second portions of the encrypted elementary bit stream are unencrypted.

20 Claims, 26 Drawing Sheets

(56) References Cited

U.S. PATENT DOCUMENTS

| | | | | |
|---|---|---|---|---|
| 5,627,694 A * | 5/1997 | Ido | G11B 15/4678 | 360/48 |
| 5,659,614 A * | 8/1997 | Bailey, III | G06F 11/1451 | 707/999.001 |
| 5,761,302 A * | 6/1998 | Park | H04N 5/913 | 380/201 |
| 5,767,800 A * | 6/1998 | Machida | H04N 19/89 | 341/67 |
| 5,923,813 A * | 7/1999 | Okamoto | G06T 9/007 | 375/E7.273 |
| 5,948,119 A * | 9/1999 | Bock | H03M 13/09 | 714/752 |
| 6,021,199 A * | 2/2000 | Ishibashi | G11B 20/00086 | 375/E7.211 |
| 6,028,932 A * | 2/2000 | Park | H04N 5/913 | 380/203 |
| 6,070,198 A * | 5/2000 | Krause | G06F 9/4426 | 712/E9.083 |
| 6,144,946 A * | 11/2000 | Iwamura | G06F 21/10 | 705/30 |
| 6,347,144 B1 * | 2/2002 | Park | H04N 5/913 | 380/201 |
| 6,463,537 B1 * | 10/2002 | Tello | G06F 21/34 | 380/277 |
| 6,490,353 B1 * | 12/2002 | Tan | H04L 9/088 | 380/278 |
| 6,501,369 B1 * | 12/2002 | Treharne | B60R 25/24 | 307/10.5 |
| 6,614,843 B1 * | 9/2003 | Gordon | H04N 5/4401 | 348/E5.104 |
| 6,628,890 B1 * | 9/2003 | Yamamoto | H04N 7/16 | 348/E7.054 |
| 6,671,323 B1 * | 12/2003 | Tahara | G11B 27/031 | 375/240.12 |
| 6,772,343 B1 * | 8/2004 | Shimizu | H04L 9/0625 | 380/37 |
| 6,865,747 B1 * | 3/2005 | Mercier | G11B 20/00086 | 348/E5.007 |
| 6,988,238 B1 * | 1/2006 | Kovacevic | H04L 1/0083 | 348/E5.108 |
| 7,058,179 B1 * | 6/2006 | Maruo | H04N 7/1675 | 348/E5.004 |
| 7,095,858 B2 * | 8/2006 | Wagner | G06F 21/572 | 380/281 |
| RE39,319 E * | 10/2006 | Park | H04N 5/913 | 380/201 |
| 7,127,619 B2 * | 10/2006 | Unger | H04N 7/162 | 713/189 |
| 7,203,955 B2 * | 4/2007 | Mercier | G11B 20/00086 | 348/E5.007 |
| 7,286,667 B1 * | 10/2007 | Ryal | H04N 21/4622 | 348/E5.004 |
| 7,287,168 B2 * | 10/2007 | Candelore | H04N 7/162 | 348/E7.056 |
| 7,308,099 B1 * | 12/2007 | Allamanche | H04K 1/00 | 348/E7.056 |
| 7,350,082 B2 * | 3/2008 | Candelore | H04N 5/783 | 348/E7.056 |
| 7,434,052 B1 * | 10/2008 | Rump | H04N 7/1675 | 348/E7.056 |
| 7,486,273 B1 * | 2/2009 | Aviles | G06F 3/016 | 345/156 |
| 7,604,172 B2 * | 10/2009 | Onogi | G06K 7/10712 | 235/439 |
| 7,636,439 B2 * | 12/2009 | Nakabayashi | H04L 9/0662 | 380/44 |
| RE41,074 E * | 1/2010 | Park | H04N 5/913 | 380/201 |
| 7,657,032 B2 * | 2/2010 | Sako | G11B 20/00086 | 380/203 |
| 7,668,314 B2 * | 2/2010 | Kuwabara | H04L 9/12 | 380/244 |
| 7,802,277 B2 * | 9/2010 | Medford | H04N 21/23476 | 380/200 |
| 7,841,531 B2 * | 11/2010 | Onogi | G06K 7/10712 | 235/439 |
| 7,929,698 B2 * | 4/2011 | Candelore | H04N 7/1675 | 380/216 |
| RE42,921 E * | 11/2011 | Park | H04N 5/913 | 380/201 |
| RE42,922 E * | 11/2011 | Park | H04N 5/913 | 380/201 |
| RE42,950 E * | 11/2011 | Park | H04N 5/913 | 380/201 |
| RE42,951 E * | 11/2011 | Park | H04N 5/913 | 380/201 |
| 8,055,910 B2 * | 11/2011 | Kocher | G06F 21/10 | 280/228 |
| 8,131,646 B2 * | 3/2012 | Kocher | G06F 21/10 | 370/270 |
| 8,159,373 B2 * | 4/2012 | Markram | H04L 25/493 | 341/50 |
| 8,170,210 B2 * | 5/2012 | Manders | H04N 5/783 | 380/217 |
| 8,196,694 B2 * | 6/2012 | Biondo | B60K 28/063 | 180/271 |
| 8,199,356 B2 * | 6/2012 | Nakata | G06F 3/1203 | 358/1.16 |
| 8,201,195 B2 * | 6/2012 | Medford | H04N 21/23476 | 380/200 |
| 8,243,921 B1 * | 8/2012 | Ryal | H04N 21/4405 | 380/200 |
| 8,264,731 B1 * | 9/2012 | Nakata | G06F 3/1203 | 358/1.16 |
| 8,300,010 B2 * | 10/2012 | Aviles | G06F 3/016 | 345/156 |
| 8,571,993 B2 * | 10/2013 | Kocher | G06F 21/10 | 380/201 |
| 8,655,158 B2 * | 2/2014 | Haddad | G11B 27/005 | 386/248 |
| 8,726,387 B2 * | 5/2014 | Stahlberg | G06F 21/51 | 705/50 |
| 2002/0071491 A1 * | 6/2002 | Sugiyama | H04N 19/00 | 375/240.23 |
| 2002/0196939 A1 * | 12/2002 | Unger | H04N 7/162 | 380/216 |
| 2003/0021412 A1 * | 1/2003 | Candelore | H04N 7/162 | 380/217 |
| 2003/0028706 A1 * | 2/2003 | Okada | G11B 20/10 | 711/100 |
| 2003/0037213 A1 * | 2/2003 | Mittag | G06F 12/1466 | 711/163 |
| 2003/0081776 A1 * | 5/2003 | Candelore | H04N 7/162 | 380/200 |
| 2003/0152368 A1 * | 8/2003 | Kitani | G11B 20/00086 | 386/257 |
| 2004/0003008 A1 * | 1/2004 | Wasilewski | H04N 21/63345 | |
| 2004/0028231 A1 * | 2/2004 | Sako | G11B 20/00086 | 380/239 |
| 2004/0047470 A1 * | 3/2004 | Candelore | H04N 5/783 | 380/240 |
| 2004/0054651 A1 * | 3/2004 | Katayama | H03M 13/2906 | |
| 2004/0073917 A1 * | 4/2004 | Pedlow, Jr. | H04L 63/0428 | 725/31 |
| 2004/0091114 A1 * | 5/2004 | Carter | G06F 21/606 | 380/259 |
| 2004/0107350 A1 * | 6/2004 | Wasilewski | H04N 21/63345 | 713/182 |
| 2004/0136532 A1 * | 7/2004 | Pinder | H04N 21/63345 | 380/239 |
| 2004/0139337 A1 * | 7/2004 | Pinder | H04N 21/63345 | 713/189 |
| 2005/0008162 A1 * | 1/2005 | Brokenshire | H04L 9/0618 | 380/277 |
| 2005/0069132 A1 * | 3/2005 | Sakai | H04N 5/913 | 380/239 |
| 2005/0114909 A1 * | 5/2005 | Mercier | G11B 20/00086 | 725/141 |

(56) References Cited

U.S. PATENT DOCUMENTS

| | | | |
|---|---|---|---|
| 2005/0123136 A1* | 6/2005 | Shin | G11B 20/00086 380/217 |
| 2005/0232139 A1* | 10/2005 | Balakrishnan | H04L 27/2602 370/208 |
| 2006/0036551 A1* | 2/2006 | Oliveira | H04N 21/835 705/51 |
| 2006/0056625 A1* | 3/2006 | Nakabayashi | H04L 9/0662 380/46 |
| 2006/0078211 A1* | 4/2006 | Tjandrasuwita | H04N 19/176 382/239 |
| 2006/0086796 A1* | 4/2006 | Onogi | G06K 7/10712 235/454 |
| 2006/0106870 A1* | 5/2006 | Franaszek | H03M 7/3088 |
| 2006/0184790 A1* | 8/2006 | Oliveira | H04H 60/14 713/160 |
| 2006/0222178 A1* | 10/2006 | Kuwabara | H04L 9/12 380/201 |
| 2006/0282665 A1* | 12/2006 | Zhu | H04N 7/1675 713/160 |
| 2007/0033419 A1* | 2/2007 | Kocher | G06F 21/10 713/193 |
| 2007/0083467 A1* | 4/2007 | Lindahl | G11B 20/00086 705/50 |
| 2007/0103715 A1* | 5/2007 | Nakata | G06F 3/1203 358/1.14 |
| 2007/0140307 A1* | 6/2007 | Mercier | G11B 20/00086 370/535 |
| 2007/0160208 A1* | 7/2007 | MacLean | H04N 7/1675 380/210 |
| 2007/0180235 A1* | 8/2007 | Lelegard | H04N 7/1675 713/160 |
| 2007/0192789 A1* | 8/2007 | Medford | H04N 21/23476 725/31 |
| 2007/0258583 A1* | 11/2007 | Wajs | H04N 21/26606 380/42 |
| 2008/0137848 A1* | 6/2008 | Kocher | G06F 21/10 380/201 |
| 2008/0273698 A1* | 11/2008 | Manders | H04N 5/783 380/200 |
| 2008/0310630 A1* | 12/2008 | Candelore | H04N 7/1675 380/217 |
| 2008/0317246 A1* | 12/2008 | Manders | H04N 5/783 380/37 |
| 2009/0103820 A1* | 4/2009 | Chang | H04N 19/176 382/237 |
| 2009/0193313 A1* | 7/2009 | Kong | H03M 13/29 714/755 |
| 2009/0208000 A1* | 8/2009 | Yoshioka | H04N 7/1675 380/42 |
| 2009/0214128 A1* | 8/2009 | Chen | H04N 5/44504 382/246 |
| 2009/0262929 A1* | 10/2009 | Walmsley | G06F 21/85 380/46 |
| 2010/0123607 A1* | 5/2010 | He | H03M 7/30 341/51 |
| 2010/0135637 A1* | 6/2010 | McDermott | G11B 27/034 386/344 |
| 2010/0166052 A1* | 7/2010 | Okuda | H04N 19/91 375/240 |
| 2010/0226443 A1* | 9/2010 | Citta | H04N 21/23439 375/240.26 |
| 2011/0004899 A1* | 1/2011 | Medford | H04N 21/23476 725/32 |
| 2011/0069834 A1* | 3/2011 | Urbanik | H04L 9/0618 380/28 |
| 2011/0170687 A1* | 7/2011 | Hyodo | H04L 9/0637 380/200 |
| 2011/0194687 A1* | 8/2011 | Brothers | H04L 9/0668 380/44 |
| 2012/0020475 A1* | 1/2012 | Altmann | H04N 21/23476 380/42 |
| 2012/0063595 A1* | 3/2012 | Massoudi | H04N 7/1675 380/210 |
| 2012/0134496 A1* | 5/2012 | Farkash | H04N 7/167 380/210 |
| 2012/0213363 A1* | 8/2012 | Manders | H04N 5/783 380/255 |
| 2013/0067211 A1* | 3/2013 | Farrugia | H04L 9/0637 713/150 |
| 2013/0117575 A1* | 5/2013 | Kataoka | G06F 21/602 713/189 |
| 2013/0156186 A1* | 6/2013 | Candelore | H04N 7/1675 380/210 |

* cited by examiner

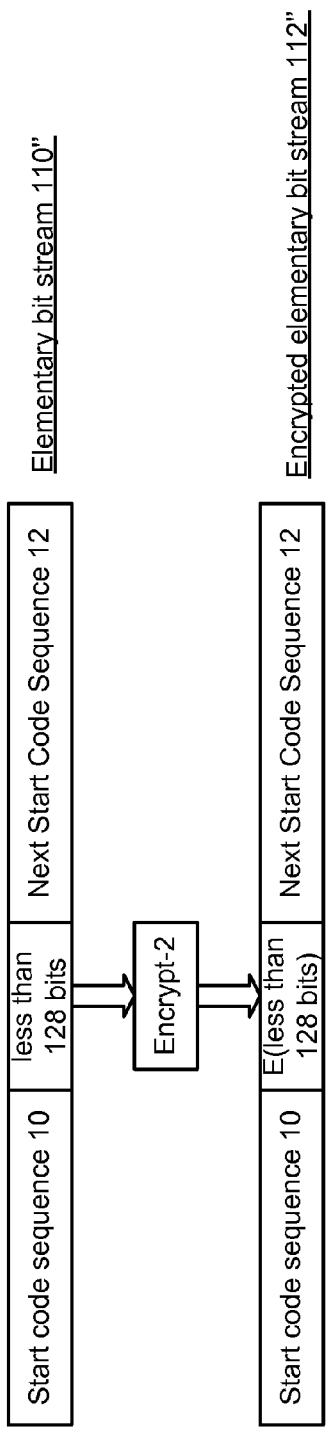
FIG. 7
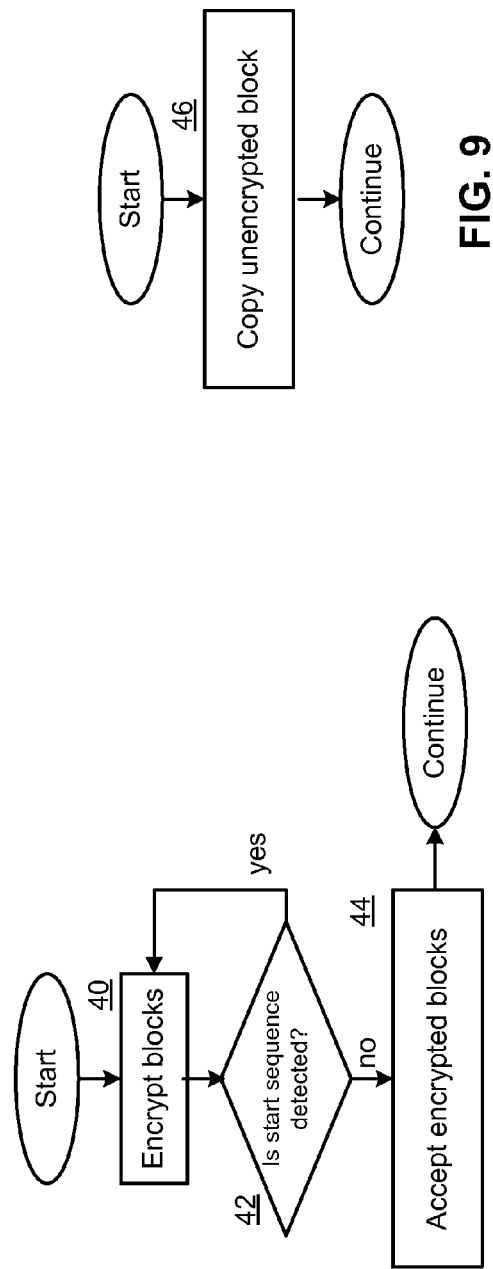
FIG. 9
FIG. 8

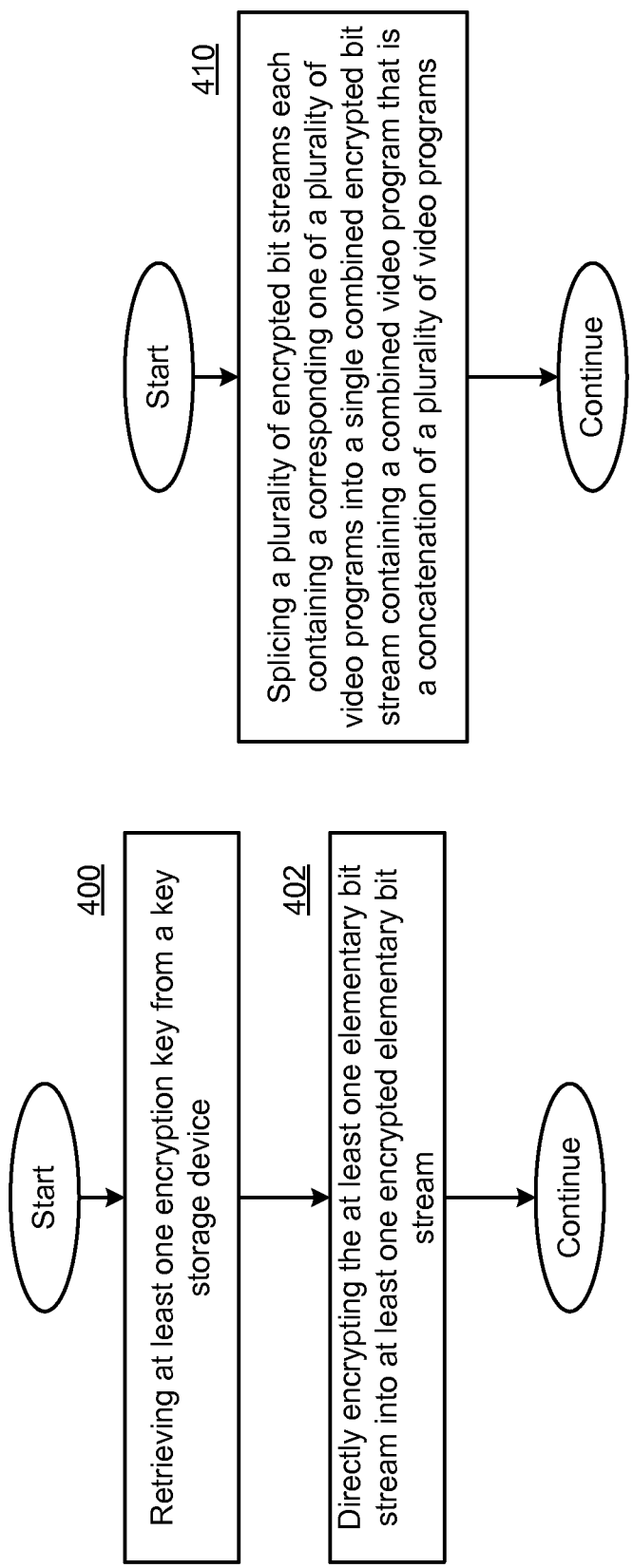

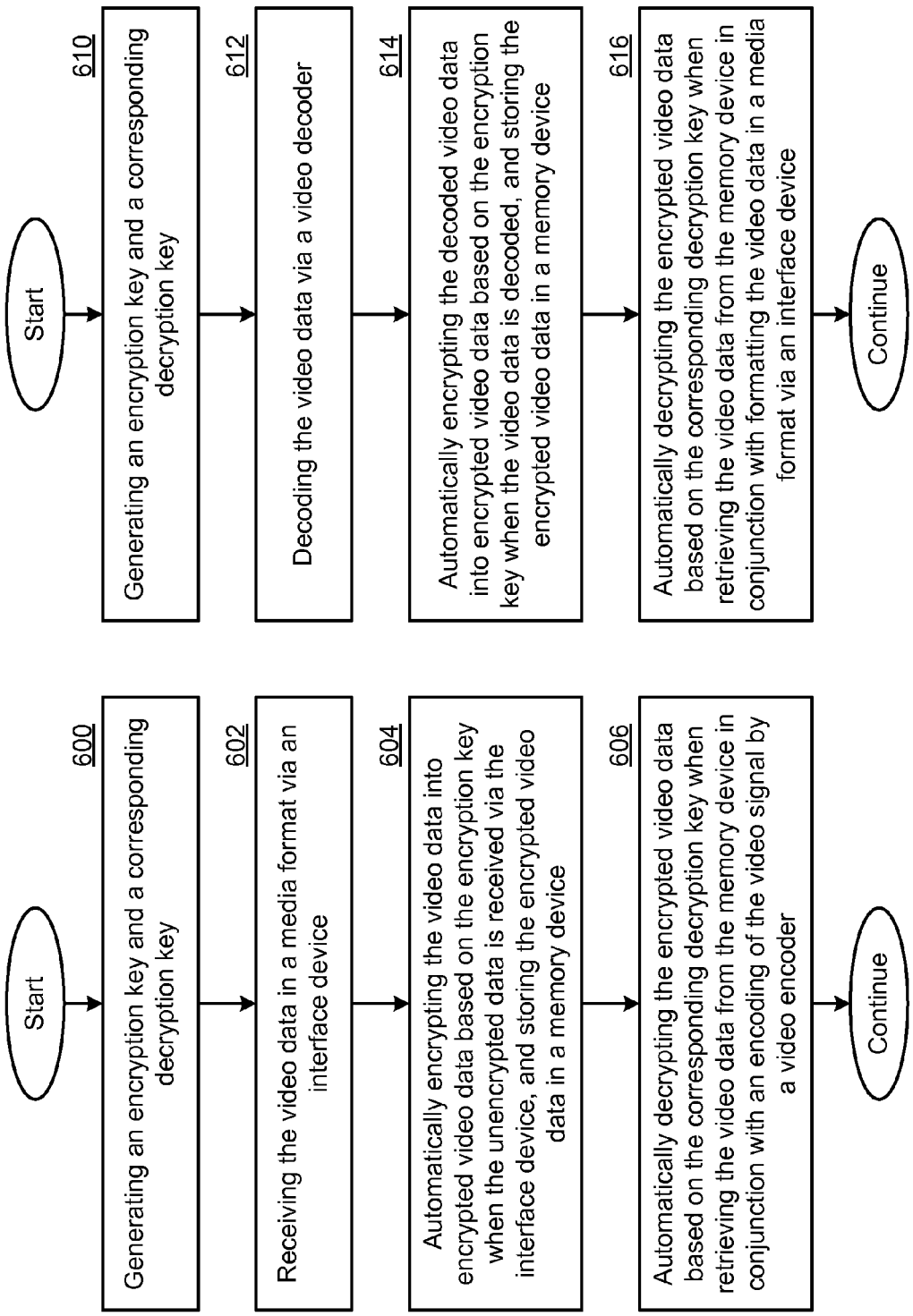

CONTAINER AGNOSTIC DECRYPTION DEVICE AND METHODS FOR USE THEREWITH

CROSS-REFERENCE TO RELATED APPLICATIONS

The present U.S. Utility patent application claims priority pursuant to 35 U.S.C. §120 as a continuation of U.S. Utility application Ser. No. 13/423,981, entitled "CONTAINER AGNOSTIC DECRYPTION DEVICE AND METHODS FOR USE THEREWITH", filed Mar. 19, 2012, issued as U.S. Pat. No. 9,008,308 on Apr. 14, 2015, which claims priority pursuant to 35 U.S.C. §119(e) to U.S. Provisional Application No. 61/596,549, entitled "CONTAINERS AGNOSTIC COMPRESSION", filed Feb. 8, 2012, and U.S. Provisional Application No. 61/604,228, entitled "ENCRYPTION/DECRYPTION DEVICE AND METHODS FOR USE THEREWITH," filed Feb. 28, 2012, all of which are hereby incorporated herein by reference in their entirety and made part of the present U.S. Utility patent application for all purposes.

TECHNICAL FIELD OF THE INVENTION

The present invention relates to secure distribution and protection of content such as media content.

DESCRIPTION OF RELATED ART

Currently the delivery of Encryption Video/Audio Compressed content is managed with a variety of container formats. Examples of such container formats are encrypted Internet Protocol (IP) packets such as used in IP TV, Digital Transmission Content Protection (DTCP), etc. In this case the payload of IP packets contain several transport stream (TS) packets and the entire payload of the IP packet is encrypted. Other examples of container formats include encrypted TS streams used in Satellite/Cable Broadcast, etc. In these cases the payload of TS packets contain packetized elementary stream (PES) packets. Again, the entire payload of the container format, i.e. the TS packet, is encrypted. Further digital video discs (DVDs) and Blu-Ray Discs (BDs) utilize PES streams where the payload of each PES packet is encrypted. Note that PES packets are large packets which encapsulate an Elementary Stream (ES) which comprises small structures such as slices, macro blocks, and motion vectors for video and compressed pulse code modulation (PCM) samples for audio.

The processing of encrypted container streams must be performed at various stages of video distribution. Certain operations such as trick mode video operations are not able to operate on encrypted content because the framing information, such as the group of pictures (GOP) structure, is not available in the encrypted state. This implies that in order to perform trick mode operations such as fast forward, rewind, etc., the encrypted content must be decrypted and must reside in memory. This problem is particularly obstructive for DVD and Blu-Ray discs where content has to be decrypted to perform trick mode features. Certain operations such as storage of content to a Hard Disk (as in a PVR system) are also hampered because it is not possible to determine boundaries associated within the encrypted content on the Hard Disk without decrypting the content. This often involves extra work to decrypt content, parse clear content and record index files with pointers into the containers on disk. In addition, other operations such as splicing of two streams are hampered because it is not possible to determine boundaries associated within the encrypted content. This requires that both streams be decrypted in order to perform correct splicing.

The process of decrypting compressed content at the container level is an expensive process which involves multiple transfers to/from memory which requires additional memory buffers and consumes bandwidth. This introduces a security risk because clear compressed content resides in memory for a period of time. There are various attacks where hackers attempt to read and export the compressed content, particularly in low end software only solutions where third party software operates in the same memory space that stores the content to be protected. This process can require additional H/W resources such as separate compression and encryption blocks. These are typically implemented as completely separate blocks which operate asynchronously requiring separate data paths and control interfaces.

The process of decrypting compressed content also inserts latency because it requires additional time and overhead to manipulate the content between the various stages of compress/encrypt and decrypt/decode. This can force the system to operate on large blocks of data (i.e. large containers) which are generally not aligned to the native video/audio boundaries.

The limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIGS. 5-7 present schematic block diagram representations of elementary and encrypted elementary bit streams in accordance with an embodiment of the present invention.

FIGS. 8 and 9 present flowchart representations of encryption algorithms in accordance with an embodiment of the present invention.

FIG. 30 presents a flowchart representation of a method in accordance with an embodiment of the present invention.

FIG. 31 presents a flowchart representation of a method in accordance with an embodiment of the present invention.

FIG. 37 presents a flowchart representation of a method in accordance with an embodiment of the present invention.

FIG. 38 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
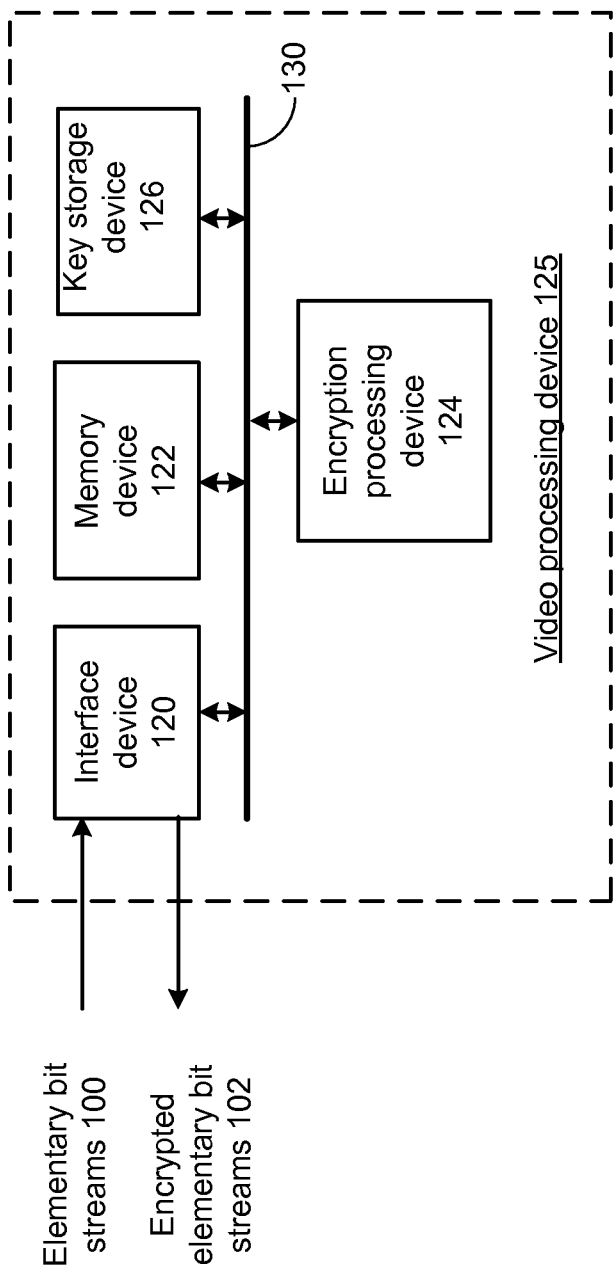
FIG. 1 presents a schematic block diagram representation of a video processing device 125 in accordance with an embodiment of the present invention.

FIG. 1 presents a schematic block diagram representation of a video processing device 125 in accordance with an embodiment of the present invention. In this embodiment, instead of encrypting video data at the container level, the encryption operation operates at the ES level. In particular, video processing device 125 includes an interface device 120 that receives elementary bit streams 100 from an encoder that includes compressed video and/or audio streams. A key storage device 126 stores one or more encryption keys. In an embodiment of the present invention, key storage device 126 is implemented via be a memory device that may be separate from or included within memory module 122. Such a memory device can include a hard disk drive or other disk drive, read-only memory, random access memory, volatile memory, non-volatile memory, static memory, dynamic memory, flash memory, cache memory, and/or any device that stores digital information. In an embodiment of the present invention, the existing conditional access/digital rights management may be used to perform a key exchange and rights management to populate and/or share the keys from key storage device 126. In particular, audio/video content can be encrypted at the ES level using the same key or keys which would traditionally be used at the (IP/TS/PES) container level, however different keys can also be employed, particularly in embodiments discussed later in conjunction with transcryption.

The encryption processing device 124 retrieves the encryption key or keys from the key storage device 126 and directly encrypts the elementary bit streams 100 into encrypted elementary bit streams 102. In pertinent part, portions of the audio and video elementary bit streams are encrypted and other portions, such as header and control data are left unencrypted to facilitate the processing of the encrypted elementary bit streams 102, while still encrypted. For example, the encryption processing device 124 can encrypt the elementary streams 100 without encrypting framing data associated with the compressed video signal. This allows some operations, such as disc seek operations, trick play features, PVR functions, etc., to be performed without decrypting the stream.

The encrypted elementary stream 102 is a container-agnostic encryption format that allows the audio and video content to be carried in any container (IP/TS/PES) without having to perform encryption at the container level. In this fashion, the encryption processing device 124 encrypts the elementary streams 100 without encrypting formatting data associated with container formats that may be employed to carry the compressed video signal.

In an embodiment of the present invention, the encryption processing device 124 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 122. Memory module 122 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown that employs a single bus 130, alternative architectures using direct connectivity between one or more modules and/or additional buses can likewise be implemented in accordance with the present invention.

The video processing device 125 can be implemented in conjunction with a video encoder, transcoder or decoder that produces the elementary bit streams 100. In this fashion, the video processing device 125 can embed the encryption operations within an encoder, transcoder or decoder which operates at the ES level. Further details, including optional implementations and additional functions and features are described in conjunction with FIGS. 2-17 that follow.

Figure 2:
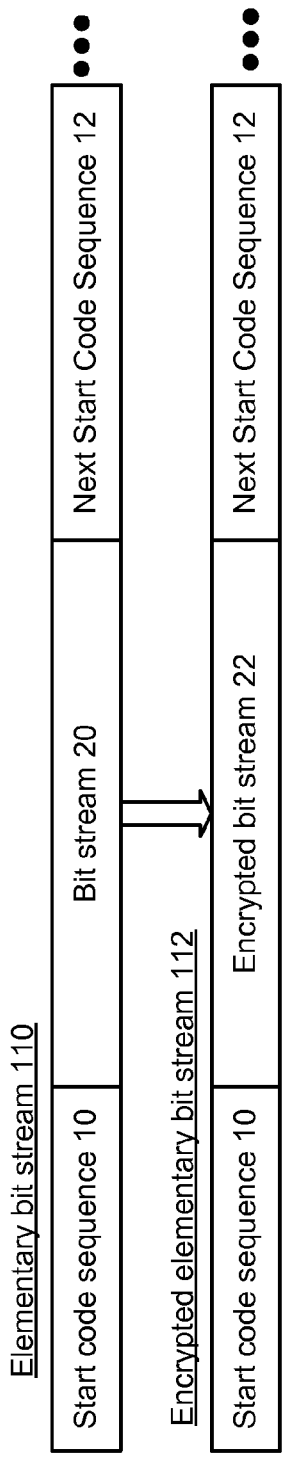
FIG. 2 presents a schematic block diagram representation of an elementary and encrypted elementary bit streams in accordance with an embodiment of the present invention.

FIG. 2 presents a schematic block diagram representation of an elementary and encrypted elementary bit streams in accordance with an embodiment of the present invention. In particular, an elementary bit stream 110 is shown that carries a compressed video bit stream 20 in the payload. As shown, portions of the video bit stream 20 are separated by an initial start code sequence 10 such as (0x00, 0x00, 0x01, 0xTT) or other start code sequence and the next start code sequence 12. The encrypted elementary bit stream 112 is formed from the same start code sequences 10 and 12, but by encrypting the bit stream 20 into encrypted bit stream 22.

The video bit stream 20 includes encoded information pertaining to the Macro Blocks, Motion Vectors, Quantization Matrices, etc., of the frames and fields of the video signal. This portion is encrypted to protect the content of the video signal, but leaves framing information un-encrypted. In this fashion, the framing information for all layers of video distribution (i.e. all IP, TS, PES containers) would be left un-encrypted and only portions of the lowest level Elementary Stream (ES) would be encrypted. In this scenario the encrypted Video content would be un-usable but all the structural information involving framing and timing would be available so that the stream may be manipulated while in the encrypted state.

There are several options as to which level or which portion of the ES bit stream to encrypt. It may be sufficient to only encrypt ES video sequences within I-frames as these are critical for decoding of P and B frames and if the I-frame is corrupted then the rest of the video frame will not decode properly. This would reduce the performance requirements because fewer bit sequences would have to be encrypted but it would require parsing of the video to detect I-frames. Another logical point to apply ES encryption for video would be at the slice level only as this is a conveniently identifiable sequence within the bit stream.

Figure 3:
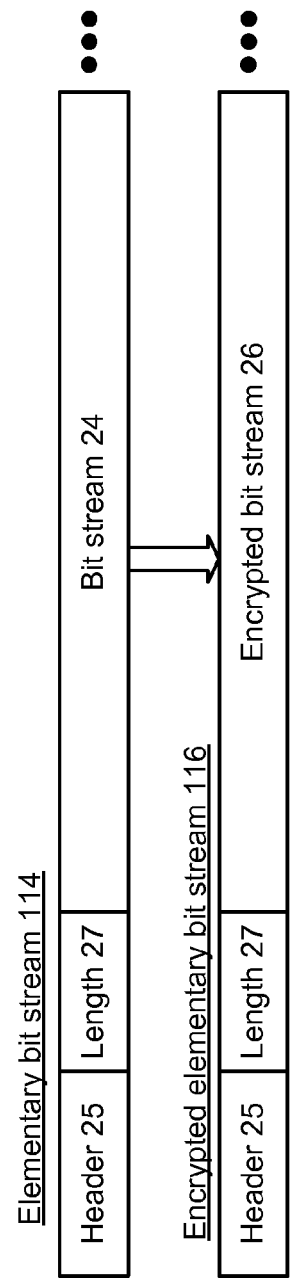
FIG. 3 presents a schematic block diagram representation of an elementary and encrypted elementary bit streams in accordance with an embodiment of the present invention.

FIG. 3 presents a schematic block diagram representation of an elementary and encrypted elementary bit streams in accordance with an embodiment of the present invention. In particular, an elementary bit stream 114 is shown that carries a compressed audio bit stream 24 representing compressed PCM samples in the payload. As shown, portions of the audio bit stream 24 are separated by start fields such as header 25 and length 27. The encrypted elementary bit stream 116 is formed from the same start fields but by encrypting the bit stream 24 into encrypted bit stream 26.

For Audio, the encryption functions operate on the compressed audio PCM samples but leave all framing information un-encrypted. In this way the framing information for all layers of audio distribution (i.e. all IP, TS, PES containers) would be left un-encrypted and only portions of the lowest level Elementary Stream (ES) would be encrypted. In this scenario the encrypted Audio content would be un-usable but all the structural information involving framing and timing would be available so that the stream may be manipulated while in the encrypted state.

Figure 4:
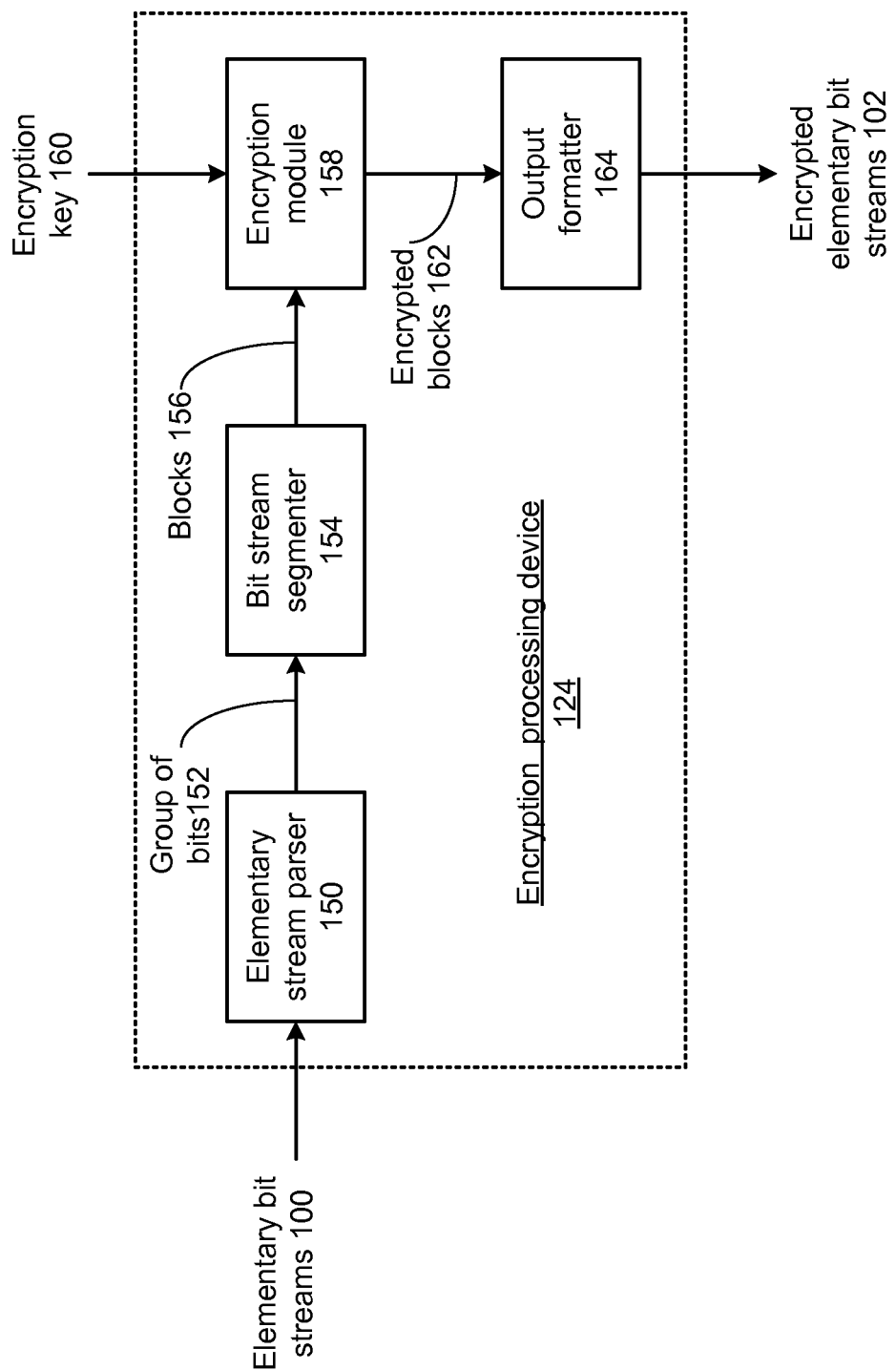
FIG. 4 presents a schematic block diagram representation of an encryption processing device 124 in accordance with an embodiment of the present invention.

FIG. 4 presents a schematic block diagram representation of an encryption processing device 124 in accordance with an embodiment of the present invention. In particular, the encryption processing device 124 includes an elementary stream parser 150 that identifies a first start code sequence and a second start code sequence in the elementary bit streams 100 and further that identifies a group of bits 152 between the first start code sequence and the second start code sequence, wherein the second start code sequence, such as next start code sequence 12, is the next start code sequence after a start code sequence 10, in a temporal ordering of an elementary bit stream. A bit stream segmenter 154 segments the group of bits 152 into one or more blocks 156. The encryption module 158 encrypts blocks 156 into encrypted blocks 162, based on the encryption key or keys 160. The output formatter 164 generates the encrypted elementary bit stream or streams 102 from the encrypted blocks 162 by adding the headers, start code sequences, or other formatting to the stream.

Figure 5:
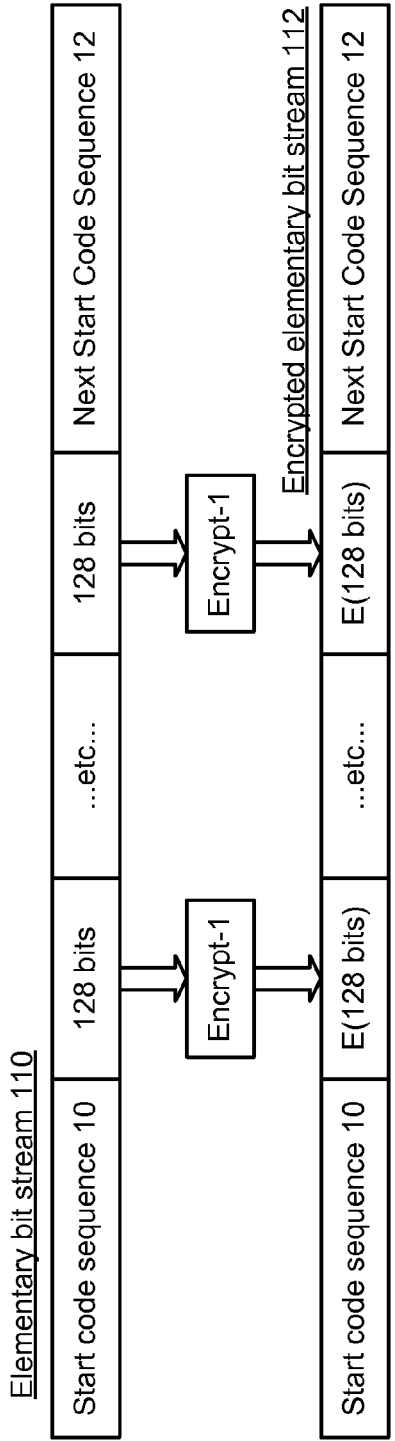
Figure 6:
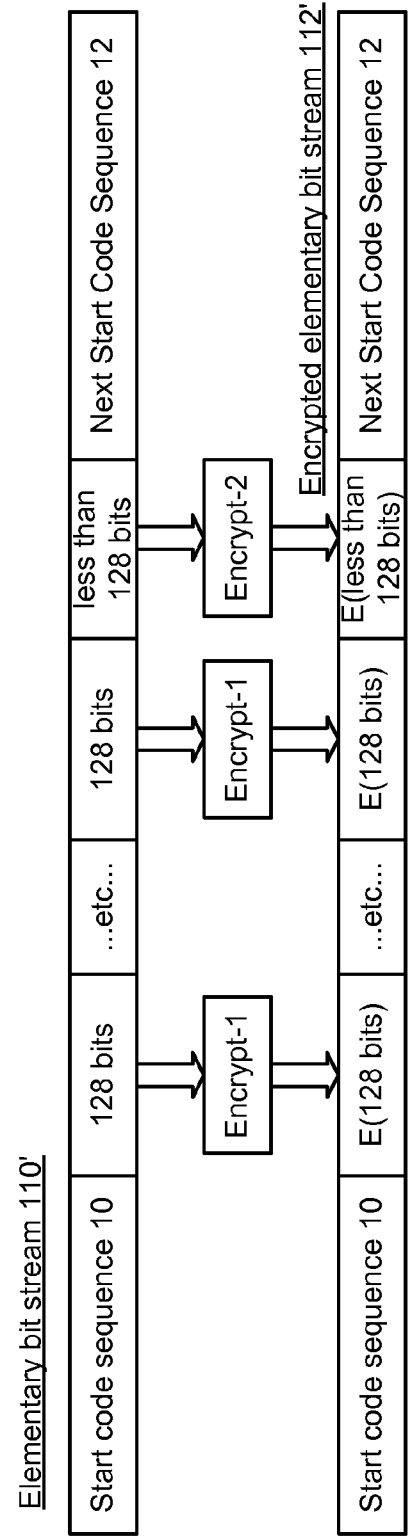

The operation of encryption processing device 124 can be described in conjunction with the examples presented in FIGS. 5-7.

FIGS. 5-7 present a schematic block diagram representations of elementary and encrypted elementary bit streams in accordance with an embodiment of the present invention. In particular, these examples are presented in conjunction with a video elementary bit stream such as elementary bit stream 110. Such a video ES can present a challenge because the payload portion that includes video bit stream 20 can consist of a series of bits of undeterminant length, bracketed only by start code sequences such as (0x00,0x00,0x01,0xTT) where: 0xTT is an 8 bit start code value; the start code sequences must always occur on 8 bit boundaries—which implies that bit sequences+padding also occupy integral 8 bit boundaries; the 0x00,0x00,0x01,0xTT sequence may never appear within the bit sequence.

The output of the elementary stream parser 150 is a group of bits 152 that falls between successive start code sequences. This group of bits 152 is segmented by bit stream segmenter 154 into blocks 156. In the example presented in conjunction with FIG. 5, the group of bits 152 is 128 bit aligned can be segmented into a plurality of blocks 156 that are each 128 bits long. The encryption module 158 operates on each of the resulting blocks 156 via a base encryption algorithm, labeled "Encrypt-1", such as an Advanced Encryption Standard (AES) encryption algorithm and more particularly, an electronic code book (ECB) as set forth in Federal Information Processing Standard (FIPS) 197-2001 or via another encryption algorithm.

In the case presented in conjunction with FIG. 6, the group of bits 152 is not 128 bit aligned but is longer than 128 bits. The bit stream segmenter 154 generates a plurality of blocks 156 that includes one or more standard blocks of standard length and a remainder block that is less than the standard length. In particular, the blocks 156 include several blocks of length 128 and a remainder block 156 that is less than 128 bits long. The encryption module 158 operates in a first encryption mode for the standard block and in a second encryption mode for the remainder block with the residual bits. In particular, the encryption module 158 encrypts the 128 bit blocks via the base encryption algorithm, and employs a second algorithm, labeled, "Encrypt-2" for the remainder block.

In the example presented in conjunction with FIG. 7, the group of bits 152 has fewer bits than the standard block size, i.e. a 128 bit block and is encrypted using algorithm Encrypt-2.

In each of the examples presented above, the group of bits 152 are encrypted without altering the start code sequence(s) which are left un-encrypted, but also encrypted in order to enforce the constraint that a start code sequence may not occur within the encrypted bit stream. This avoids inserting a false start code sequences that would be detected as a coding error when the elementary stream is processed, such as during decryption.

It should be noted that the above examples present one possible segmentation procedure for the group of bits 152. Other segmentations including the use of other block sizes could be employed. In addition, additional bit padding can be employed in bit stream segmenter 154 to force uniform block sizes in other implementations. Further details of an optional implementation of two encryption algorithms is presented in conjunction with FIGS. 8-9 that follow.

FIGS. 8 and 9 present flowchart representations of encryption algorithms in accordance with an embodiment of the present invention. In particular, an example of the Encrypt-1 algorithm is presented in FIG. 8. The encryption module 158 performs a test on the encrypted blocks 162 for an occurrence of a false start sequence, and iteratively encrypts the block 156 again using the same encryption keys 160, re-encrypting the encrypted blocks 162 iteratively until the encrypted blocks do not contain the false start sequence.

In step 40, the blocks 156 are encrypted via an encryption algorithm such as AES-ECB into encrypted blocks 162. In decision block 42, the Encrypt-1 algorithm tests the encrypted blocks 162 to detect the presence of a start code sequence or partial start code sequence. The test involves checking if the 0x00,0x00,0x01 sequence is detected anywhere in the 128 bit block or if the last bytes of the block form a 0x00,0x00,0x01 or 0x00,0x00 or a 0x00 sequence (i.e. if the last bits could be part of a start code sequence which spans 128 bit boundaries). If the start sequence is not detected, the algorithm proceeds to step 44 where the encrypted blocks 162 are accepted. If the sequence is detected then the encryption in step 40 is repeated (up to n times) until the sequence is not detected. In the simplest case the AES-ECB Encryption is performed only once.

In accordance with the example presented above, the probability that the encrypted blocks 162 are not accepted after n iterations can be found based on the following. There are 13 possible positions of the 0x00,0x00,0x01,0xTT start code sequence in the encrypted 128 bit block as set forth below:

(1) 0x00,0x00,0x01,0xTT,0xXX,0xXX,0xXX,0xXX, 0xXX,0xXX,0xXX,0xXX, 0xXX,0xXX,0xXX,0xXX (2) 0xXX,0x00,0x00,0x01,0xTT,0xXX,0xXX,0xXX, 0xXX,0xXX,0xXX,0xXX, 0xXX,0xXX,0xXX,0xXX (3) 0xXX,0xXX,0x00,0x00,0x01,0xTT,0xXX,0xXX, 0xXX,0xXX,0xXX,0xXX, 0xXX,0xXX,0xXX,0xXX (4) 0xXX,0xXX,0xXX,0x00,0x00,0x01,0xTT,0xXX, 0xXX,0xXX,0xXX,0xXX, 0xXX,0xXX,0xXX,0xXX (5) 0xXX,0xXX,0xXX,0xXX,0x00,0x00,0x01,0xTT, 0xXX,0xXX,0xXX,0xXX, 0xXX,0xXX,0xXX,0xXX (6) 0xXX,0xXX,0xXX,0xXX,0xXX,0x00,0x00,0x01, 0xTT,0xXX,0xXX,0xXX, 0xXX,0xXX,0xXX,0xXX (7) 0xXX,0xXX,0xXX,0xXX,0xXX,0xXX,0x00,0x00, 0x01,0xTT,0xXX,0xXX, 0xXX,0xXX,0xXX,0xXX (8) 0xXX,0xXX,0xXX,0xXX,0xXX,0xXX,0xXX,0x00, 0x00,0x01,0xTT,0xXX, (9) 0xXX,0xXX,0xXX,0xXX,0xXX,0xXX,0xXX,0xXX, 0x00,0x00,0x01,0xTT, 0xXX,0xXX,0xXX,0xXX

(10) 0xXX,0xXX,0xXX,0xXX,0xXX,0xXX,0xXX,0xXX, 0xXX,0xXX,0x00,0x00, 0x01,0xTT,0xXX,0xXX, 0xXX

(11) 0xXX,0xXX,0xXX,0xXX,0xXX,0xXX,0xXX,0xXX, 0xXX,0xXX,0xXX,0x00,0x00 0x01,0xTT,0xXX, 0xXX

(12) 0xXX,0xXX,0xXX,0xXX,0xXX,0xXX,0xXX, 0xXX,0xXX,0xXX, 0xXX,0x00,0x00,0x01,0xTT, 0xXX

(13) 0xXX,0xXX,0xXX,0xXX,0xXX,0xXX,0xXX, 0xXX,0xXX,0xXX,0xXX, 0xXX,0x00,0x00,0x01, 0xTT

Of the 13 possible cases, the probability that one of these cases occurs is $$P1=P2=\ldots P13=2^{104}/2^{128}=1/(2^{24})$$

In addition, there are 3 additional cases, labeled (14)-(16) below, where the start code sequence may span the 128 bit block boundary into the next 128 bit block:

(14) 0xXX,0xXX,0xXX,0xXX,0xXX,0xXX,0xXX, 0xXX,0xXX,0xXX,0xXX, 0xXX,0xXX,0x00,0x00, 0x01

(15) 0xXX,0xXX,0xXX,0xXX,0xXX,0xXX,0xXX, 0xXX,0xXX,0xXX,0xXX, 0xXX,0xXX,0xXX,0x00, 0x00

(16) 0xXX,0xXX,0xXX,0xXX,0xXX,0xXX,0xXX, 0xXX,0xXX,0xXX,0xXX, 0xXX,0xXX,0xXX,0xXX, 0x00

The probabilities associated with these cases are $$P14=2^{104}/2^{128}=1/(2^{24})$$

$$P15=2^{112}/2^{128}=1/(2^{16})$$

$$P16=2^{120}/2^{128}=1/(2^{8})$$

The probability that a complete or partial start code sequence results from an AES operation after each iteration is less than:

$$P_{reject1} = P1 + P2 + \ldots + P13 + P14 + P15 + P16$$

$$= 141/(2^{24}) + 1/(2^{16}) + 1/(2^{8})$$

$$= 0.00392234325408935546875$$

If the test detects a Start Code sequence then the encryption is repeated up to n times, the probability that the start code sequence is detected after all n encryption iterations is $$P_{rejectn}=(P_{reject1})^n$$

The probability of this form of error can be made arbitrarily small based on the choice of n. Choosing, for example, n=16, $$P_{rejectn}=3.13855363754583158460652541451 04e-39$$

This is a negligibly small probability which would result in an acceptable error rate. For example, considering a 20 Mbps ES encrypted video steam using this method, the probability of an incorrect start code sequence occurring in the encrypted ES stream equates to =5.14220627975509046821933123913 38e-34 Errors per Second =61,623,525,175,925,398,906,357,975 Years per Error If the test is bounded to 16 iterations, it is guaranteed to complete in a bounded time. In the decryption operation, a similar test is performed with the knowledge that a complete or partial start code sequence must never occur in the un-encrypted ES stream. The decryption is repeated up to n times and if a start code sequence is detected then the decryption is repeated until no start code sequence is detected. This operates to reverse the iterative encryption process. For example, if the encryption process takes i iterations to find an acceptable set of encrypted blocks 162, the decryption algorithm will likewise need to perform i decryption iterations to return to the original unencrypted data.

An example of the Encrypt-2 algorithm is presented in FIG. 9. In step 46, the Encrypt-2 algorithm uses no encryption but just copies the small block (i.e. small residual blocks are copied). It should be noted that other embodiments, other encryption or scrambling could be employed on remainder/residual blocks.

While the examples of FIGS. 5-9 have focused on elementary video streams, similar methodologies can be employed for audio ES encryption. In particular, the bit stream payload 24 of elementary bit stream 114 can be segmented into 128-bit blocks and classified into three cases similar to video ES encryption described above, one encryptional mode can be employed for encrypting complete 128 bit blocks and another encryption mode can be employed for encrypting smaller blocks or remainder/residual blocks of less than 128 bits. The encryption algorithms used in these two modes can be the same algorithms employed with encrypting video elementary streams or different algorithms.

It should be noted for both audio and video, the AES-ECB algorithm can be used rather than the typical AES-CBC and the small block processing is simplified compared to the typical Cipher Block Stealing used in many standards. This is done intentionally to preserve a property of Video and Audio encoding where great effort has been involved to support error concealment i.e. simple coding errors are often undetectable in video and audio decode. If an AES-CBC style algorithm were used then single bit errors would propagate and affect large portions of the video and audio which is undesirable. The simple small block processing similarly is intentionally not chained to prior blocks as would be the case in cipher text stealing algorithms. In some cases however, a higher level of security may be desirable. In these cases a two stage encryption (as follows) is recommended.

For ES Encryption, one technique to increase security is to use two stages of AES-128 in series with different keys in place of the Encrypt-1 and Decrypt-1 algorithms described above. In this way the cryptographic strength may be increased to 256 without increasing the width of the data operated on (i.e. the data is still 128 bits) to preserve the error concealment property. Note that two keys used for the two stages of AES encryption and decryption should be different values to maximize security but they could be the same value. In the same key value case the security level of the algorithm would be increased but backwards compatibility to existing CA and DRM systems which deliver 128 bit keys can be preserved. Alternate approaches using some other symmetrical cipher (like DES, 3DES, etc. . . . ) or other symmetric algorithm could also be employed to increase the level of security.

Figure 10:
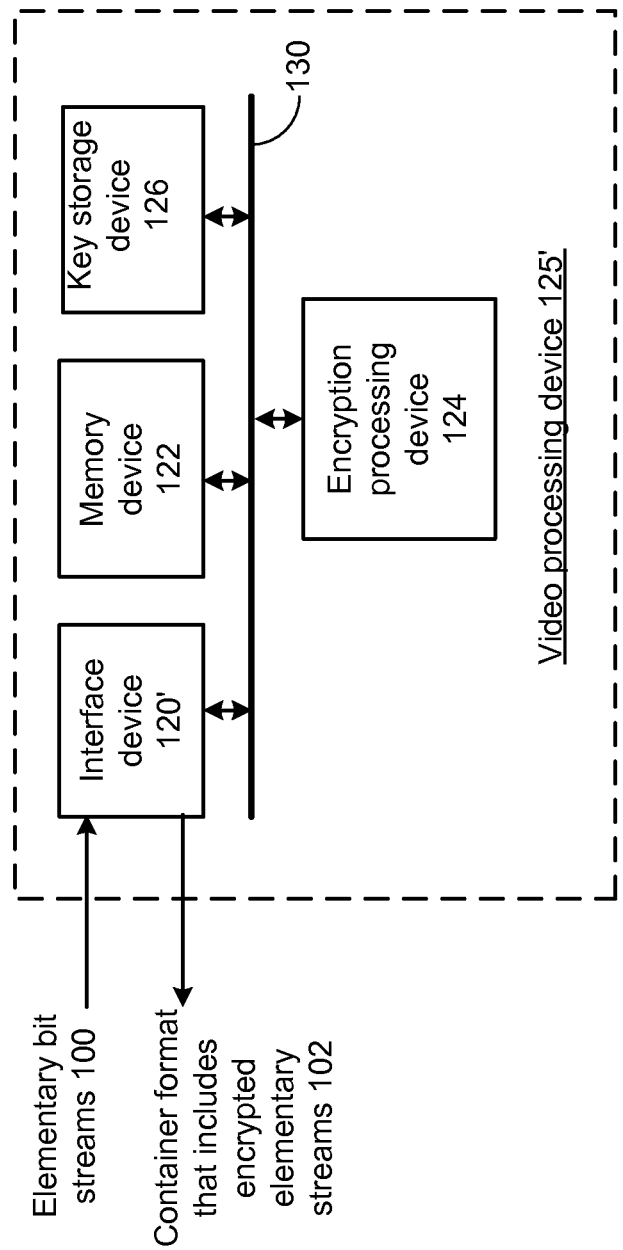
FIG. 10 presents a schematic block diagram representation of a video processing device 125' in accordance with an embodiment of the present invention.

FIG. 10 presents a schematic block diagram representation of a video processing device 125' in accordance with an embodiment of the present invention. In particular, a further embodiment of video processing device 125 is presented that includes several common functions and features that are referred to by common reference numerals. In this embodiment, the interface device 120' includes an interface module that encapsulates the encrypted elementary bit streams 102 in a container format such as PES, TS and/or IP for storage or transport. The operation of an example interface module is presented in conjunction with FIG. 11 that follows.

Figure 11:
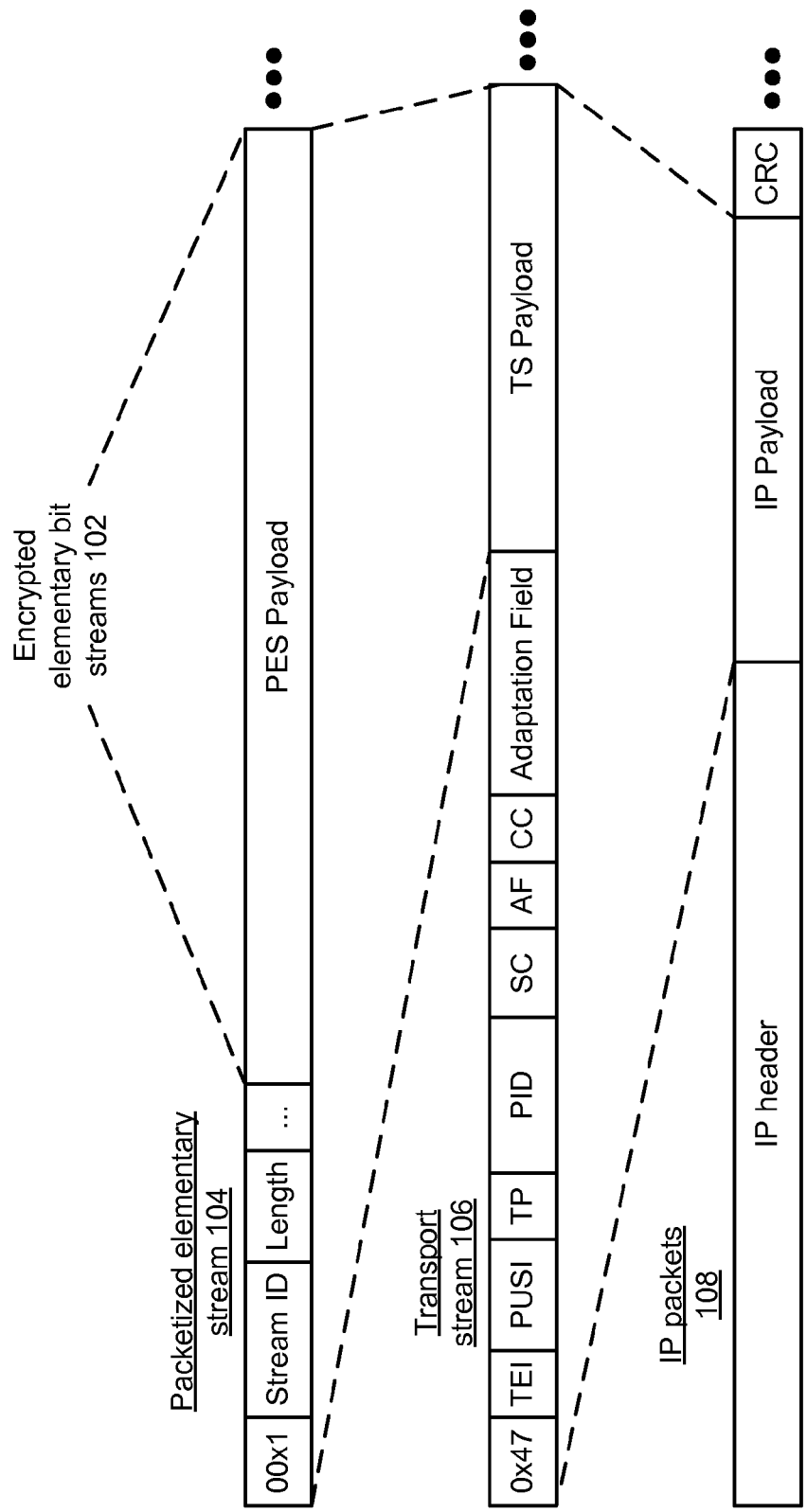
FIG. 11 presents a block diagram representation of encapsulation of encrypted elementary bit streams 102 in accordance with an embodiment of the present invention.

FIG. 11 presents a block diagram representation of encapsulation of encrypted elementary bit streams 102 in accordance with an embodiment of the present invention. As shown, the encrypted elementary bit streams can be encapsulated into the PES payload of packetized elementary stream 104 by adding a start code prefix, stream identifier (ID) length field, as well as optional stuffing bits, PES headers, error detection or correction codes and other control data.

As shown, the PES 104 can be optionally encapsulated further into the TS payload of transport stream 106 by adding a sync byte such as 0x47, a transport error indicator (TEI), a payload unit start indicator (PUSI), a transport priority (TP), a packet identifier (PID), a scrambling control field (SC), an adaptation field exist (AF), a continuity counter (CC), an adaptation field, and/or other header error detection or correction codes and/or other control data. In addition, the TS 106 can optionally be encapsulated further into the IP payload of IP packets 108 by adding an IP header and cyclic redundancy check (CRC) fields.

As previously discussed, in contrast to prior art systems that encrypt the entire IP payload, TS payload or PES payload, the encrypted elementary bit stream 102 is directly encrypted. The framing information for all layers of audio/video distribution (i.e. all IP, TS, PES containers) can be left un-encrypted and only portions of the lowest level ES 100 are encrypted. Although ES encryption is used, the higher level containers will generally still be used (i.e. IP, TS, PES). In this case it can be useful to signal that the container carries ES encryption streams. Currently the TS and PES allocate 2 bits to signal the scrambling state i.e. 00=un-encrypted, 10=even encryption, 01=odd encryption and 11=invalid. The invalid state of 11 can be used to signal that the (TS/PES) container carries ES encrypted content. In this way a decoder could recognize that the A/V bit stream has been ES encrypted. It can also be useful to allocate unused bits in the TS and PES headers to signal the polarity for the encryption in cases where key cycling is desired. Unused bits in the TS container such as the Transport Priority bit or unused bits in the adaptation field may be used for TS. Unused bits in the PES container such as the PES priority bit in the PES header may be used. A single bit could be used to indicate the even or odd cycle of encryption. In this way existing CA and DRM systems can be used to manage rights and keys but the containers would carry ES encryption bit streams.

Figure 12:
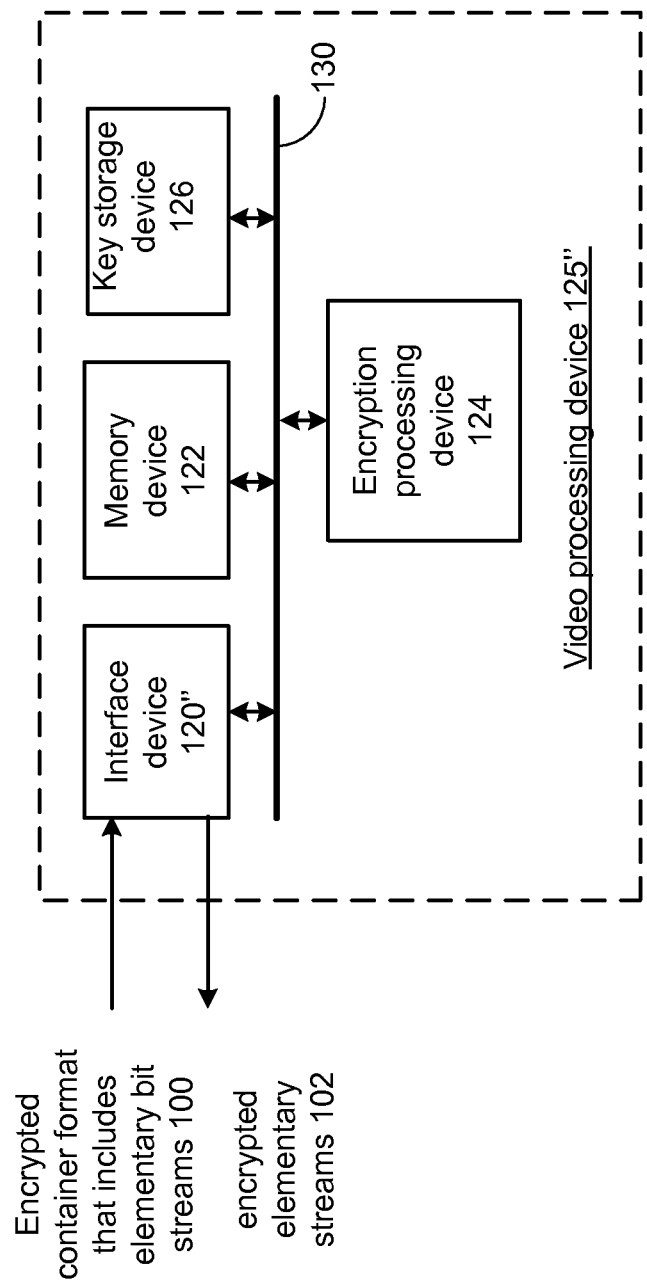
FIG. 12 presents a schematic block diagram representation of a video processing device 125" in accordance with an embodiment of the present invention.

FIG. 12 presents a schematic block diagram representation of a video processing device 125" in accordance with an embodiment of the present invention. In particular, a further embodiment of video processing device 125 is presented that includes several common functions and features that are referred to by common reference numerals. In this embodiment, the interface device 120" includes an interface module that receives a compressed video signal in an encrypted container format such as PES, TS or IP or other container format. The interface module of interface device 120" de-encapsulates and decrypts the compressed video signal to produce the elementary bit stream 100 to be processed as previously described. In this fashion, processing device 125" can receive video signals produced by legacy devices that operate with conventional encrypted container formats.

It should be noted that video processing devices 125" operates to transcrypt an encrypted container format to an encrypted elementary bit stream. For example, such a transcript device can receive encrypted content in one of the standard container formats (IP/TS/PES) which is protected by a conditional access (CA) or digital rights management (DRM). It can decrypt the protected content in its original container format then re-encrypt the content in encrypted ES format. The ES encrypted content may then be stored locally to a hard drive, used in a trick mode operation or transmitted to devices capable of decrypting the ES encrypted content. As will be discussed in conjunction with FIG. 24, the converse is also possible. ES encrypted content may be decrypted and then re-encrypted into encrypted IP/TS/PES containers. As will be discussed in conjunction with FIG. 27, another option is to transcrypt ES encrypted content into ES encrypted content using a different or same key (perhaps operating on the ES content).

Figure 13:
FIGS. 13-15 present a block diagram representation of encrypted container formats in accordance with an embodiment of the present invention.
Figure 14:
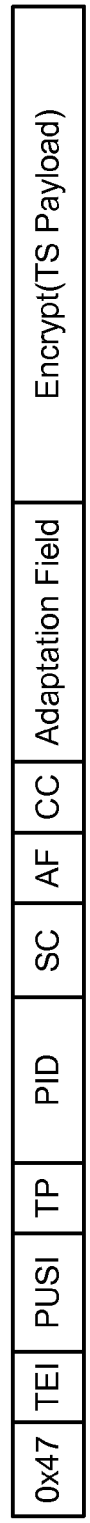
Figure 15:
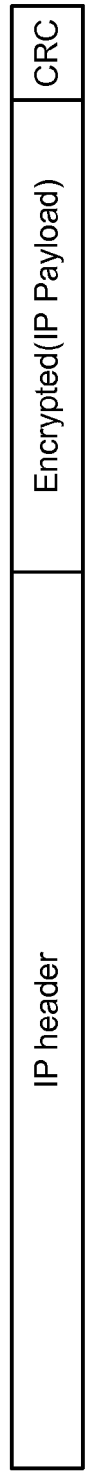

FIGS. 13-15 present a block diagram representation of encrypted container formats in accordance with an embodiment of the present invention. In particular, FIG. 13 presents a packetized elementary stream with encrypted payload 142, FIG. 14 presents a transport stream with encrypted payload 140, and FIG. 15 presents IP packets with encrypted payload 144. In operation, the interface module 120″ extracts the encrypted payload from the container format and decrypts the encrypted payload. When multiple container formats are employed, multiple steps of de-encapsulation are required to extract the elementary bit stream 100.

Figure 16:
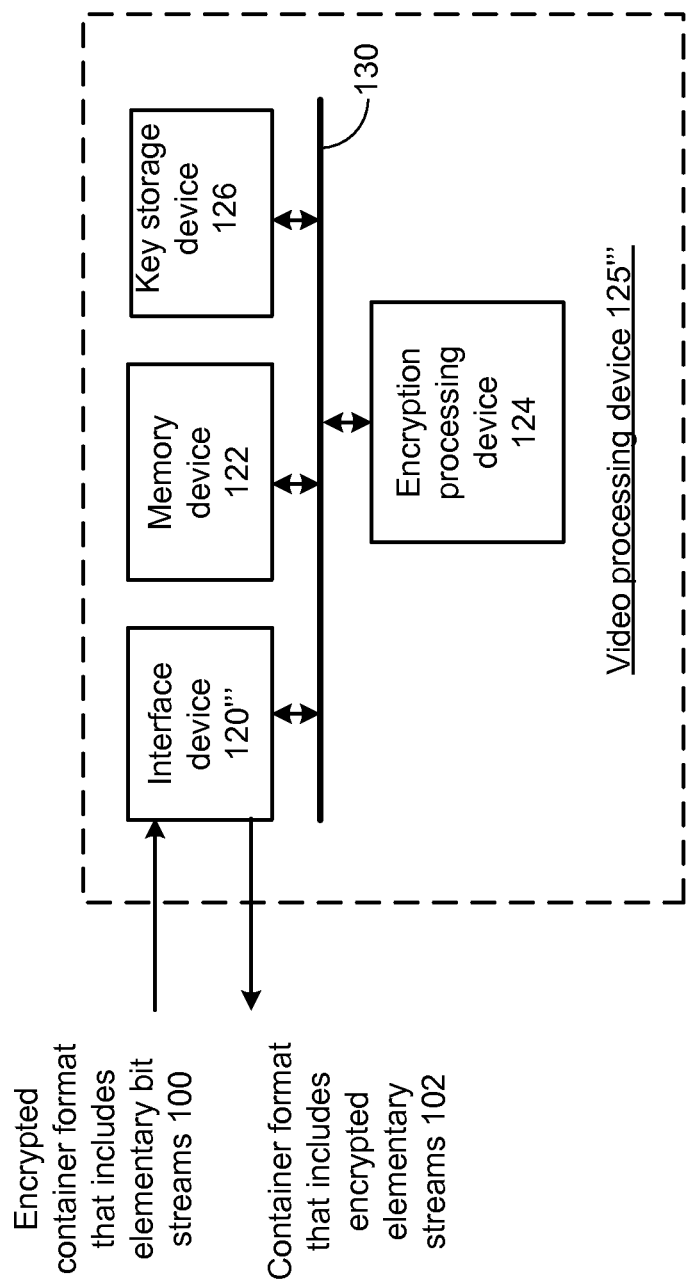
FIG. 16 presents a schematic block diagram representation of a video processing device 125''' in accordance with an embodiment of the present invention.

FIG. 16 presents a schematic block diagram representation of a video processing device 125′″ in accordance with an embodiment of the present invention. In particular, a further embodiment of video processing device 125 is presented that includes several common functions and features that are referred to by common reference numerals. In this embodiment, the interface device 120′″ includes a first interface module as described in conjunction with FIG. 12 that receives a compressed video signal in an encrypted container format such as PES, TS or IP or other container format. This interface module of interface device 120″ de-encapsulates and decrypts the compressed video signal to produce the elementary bit stream 100 to be processed as previously described. In this fashion, processing device 125″ can receive video signals produced by legacy devices that operate with conventional encrypted container formats.

In this embodiment, the interface device 120′″ further includes a second interface module as described in conjunction with FIG. 10 that encapsulates or re-encapsulates the encrypted elementary bit streams 102 in a container format such as PES, TS and/or IP for storage or transport. It should be noted that the input and output container formats may be the same format or different format, depending on the implementation.

Figure 17:
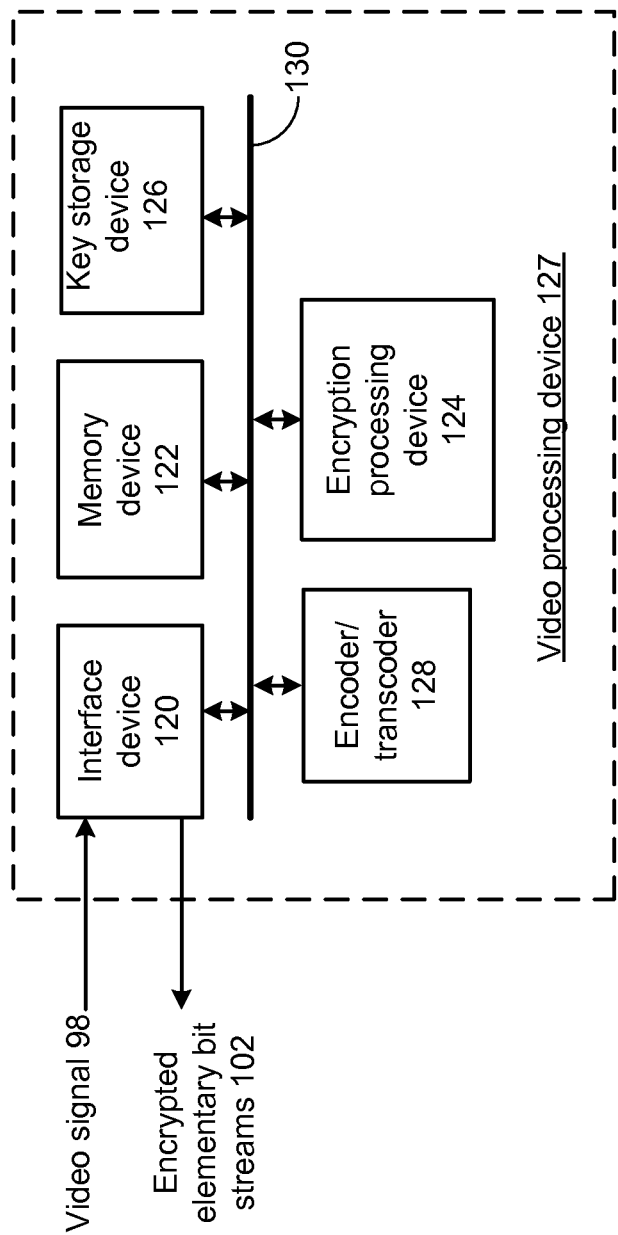
FIG. 17 presents a schematic block diagram representation of a video processing device 127 in accordance with an embodiment of the present invention.

FIG. 17 presents a schematic block diagram representation of a video processing device 127 in accordance with an embodiment of the present invention. In particular, a further embodiment of video processing device 125 is presented that includes several common functions and features that are referred to by common reference numerals. In addition, the video processing device 127 includes an encoder/transcoder 128 for further encoding or transcoding the video signal 98 from an uncompressed audio/video format to produce elementary bit streams 100 in a compressed audio/video format or from one compressed audio/video format to produce elementary bit streams 100 in another compressed audio/video format.

In an embodiment of the present invention, the video processing device 127 embeds the encryption operation within the encoder, transcoder or decoder that operates at the ES level. The video processing device produces a container-agnostic encryption format in that the A/V content is encrypted at the ES level and may be carried in any container (IP/TS/PES) without having to perform encryption at the container level. For example, the video processing device 127 can receive a video signal 98 in the form of clear un-compressed content formatter as YUV/PCM. The encoder/transcoder 128 receives the un-compressed content, compresses the content into elementary bit streams 100 in selected compressed audio and video formats, and then automatically encrypts these ES into an encrypted elementary bits streams 102. Further, as part of this single atomic operation, the video processing device 127 can write the encrypted elementary bits streams 102 to memory module 122 to protect the integrity of the content while stored.

Figure 18:
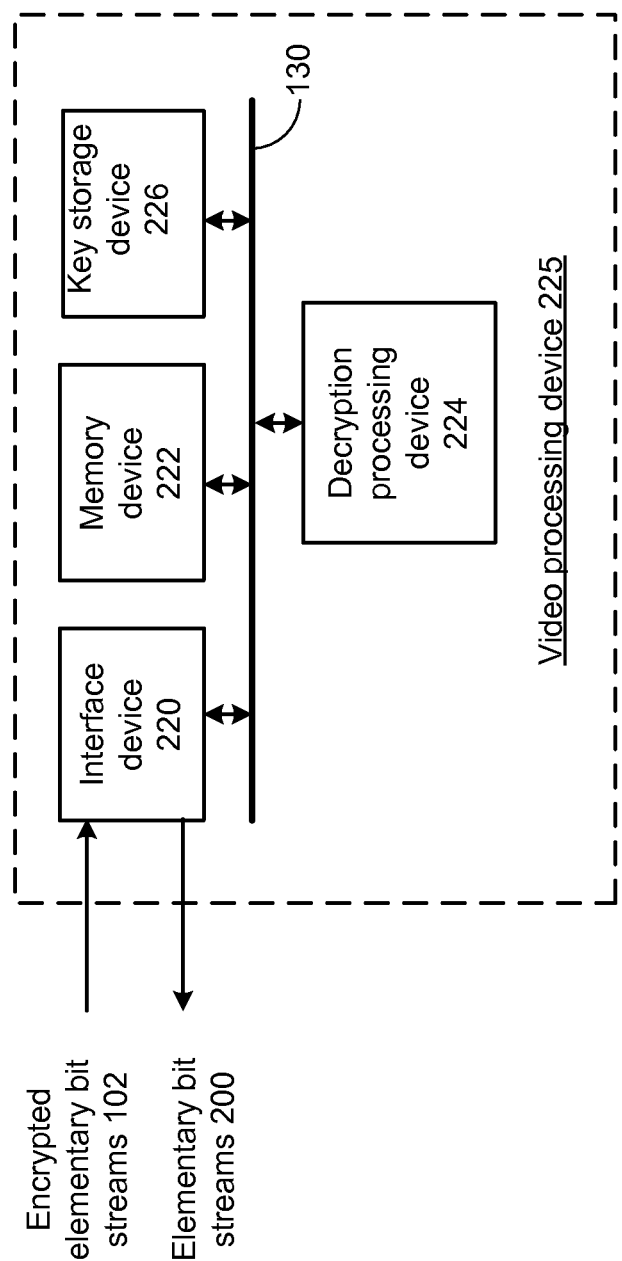
FIG. 18 presents a schematic block diagram representation of a video processing device 225 in accordance with an embodiment of the present invention.

FIG. 18 presents a schematic block diagram representation of a video processing device 225 in accordance with an embodiment of the present invention. In particular, video processing device 225 operates similarly, but in a reciprocal fashion to video processing device 125. Video processing device 225 includes a key storage device 226, similar to key storage device 126, for storing at least one decryption key. Decryption processing device 224 retrieves the at least one decryption key from the key storage device and decrypts the at least one encrypted elementary bit stream into at least one elementary bit stream 200. In particular, first portions of the at least one encrypted elementary bit stream are encrypted and second portions of the at least one encrypted elementary bit stream are unencrypted. It should be noted, that without corruption or loss in coding, transcoding or transport, elementary bit streams 200 should be equivalent to the elementary bit streams 100.

In an embodiment of the present invention, the decryption processing device 224 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 222. Memory module 222 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown that employs a single bus 230, alternative architectures using direct connectivity between one or more modules and/or additional buses can likewise be implemented in accordance with the present invention.

The video processing device 225 can be implemented in conjunction with a video decoder or transcoder that produces the elementary bit streams 200. In this fashion, the video processing device 225 can embed the decryption operations within a decoder, transcoder or encoder which operates at the ES level. Further details, including optional implementations and additional functions and features are described in conjunction with FIGS. 19-34 that follow.

Figure 19:
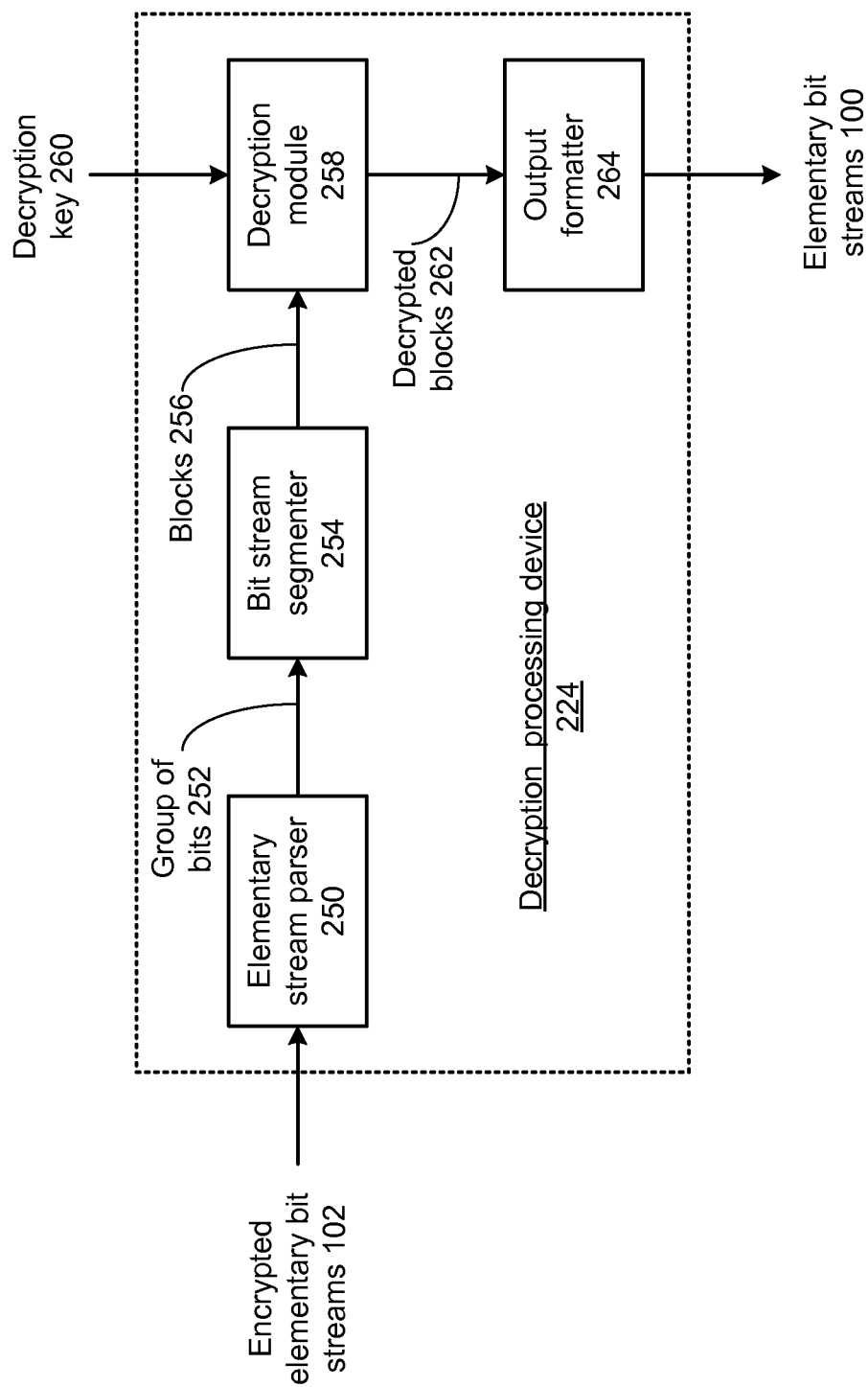
FIG. 19 presents a schematic block diagram representation of a decryption processing device 224 in accordance with an embodiment of the present invention.

FIG. 19 presents a schematic block diagram representation of a decryption processing device 224 in accordance with an embodiment of the present invention. In particular, the decryption processing device 224 includes an elementary stream parser 250 that identifies a first start code sequence and a second start code sequence in the encrypted elementary bit streams 102 and further that identifies a group of bits 252 between the first start code sequence and the second start code sequence, wherein the second start code sequence, is the next start code sequence after the first start code sequence, in a temporal ordering of the encrypted elementary bit stream. A bit stream segmenter 254 segments the group of bits 252 into one or more blocks 256. The decryption module 258 encrypts blocks 256 into decrypted blocks 262, based on the decryption key or keys 260. The output formatter 264 generates the elementary bit stream or streams 100 from the decrypted blocks 262 by adding the headers, start code sequences, or other formatting to the stream.

Figure 20:
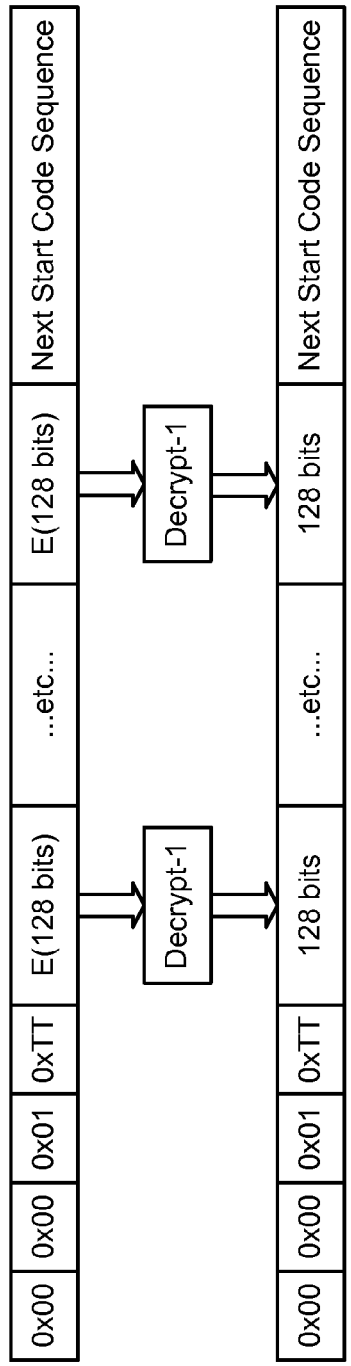
FIGS. 20-22 present schematic block diagram representations of elementary and encrypted elementary bit streams in accordance with an embodiment of the present invention.
Figure 21:
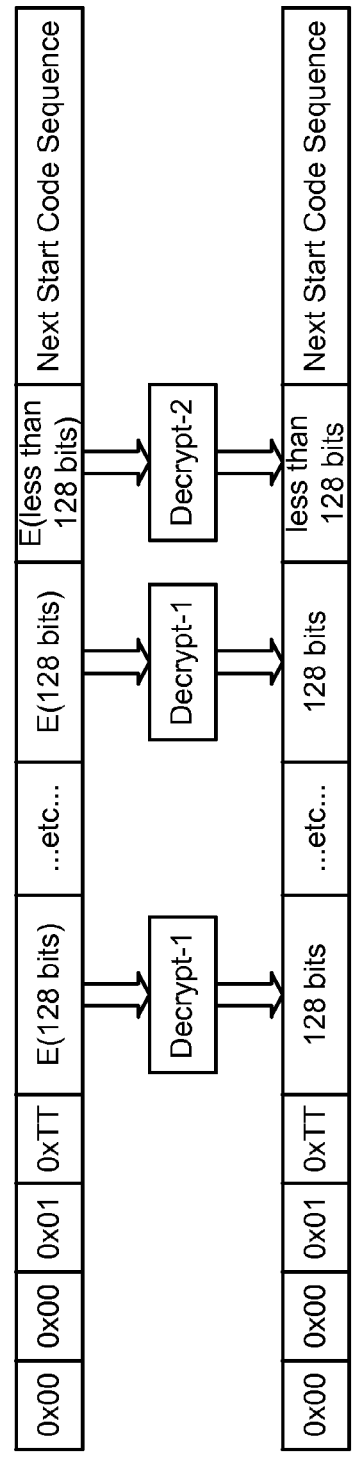
Figure 22:
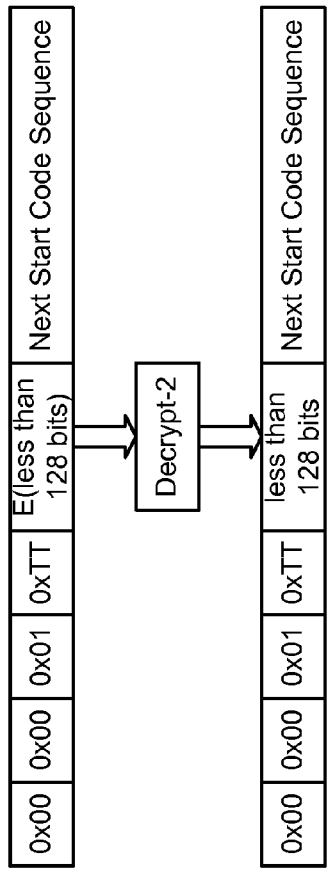

The operation of encryption processing device 124 can be described in conjunction with the examples presented in FIGS. 20-22.

FIGS. 20-22 present schematic block diagram representations of elementary and encrypted elementary bit streams in accordance with an embodiment of the present invention. In particular, these examples are presented in conjunction with a video elementary bit stream such as elementary bit stream 110. As previously discussed the payload portion can consist of a series of bits of undeterminant length, bracketed only by start code sequences such as (0x00,0x00,0x01, 0xTT) where: 0xTT is an 8 bit start code value; the start code sequences must always occur on 8 bit boundaries—which implies that bit sequences+padding also occupy integral 8 bit boundaries; and the 0x00,0x00,0x01,0xTT sequence may not otherwise appear, 8-bit aligned within the bit sequence.

The output of the elementary stream parser 250 is a group of bits 252 that falls between successive start code sequences. This group of bits 252 is segmented by bit stream segmenter 254 into blocks 256. In the example presented in conjunction with FIG. 20, the group of bits 252 is 128 bit aligned and can be segmented into a plurality of blocks 256 that are each 128 bits long. The decryption module 158 operates on each of the resulting blocks 156 via a base decryption algorithm, labeled "decrypt-1", that performs the reciprocal operation to the base encryption algorithm used to encrypt this block. Accordingly, the decryption can employ an Advanced Encryption Standard (AES) decryption algorithm and more particularly an electronic code book (ECB) as set forth in Federal Information Processing Standard (FIPS) 197-2001.

In the case presented in conjunction with FIG. 21, the group of bits 252 is not 128 bit aligned but is longer than 128 bits. The bit stream segmenter 254 generates a plurality of blocks 256 that includes one or more standard blocks of standard length and a remainder block that is not equal to the standard length. In particular, the blocks 256 include several blocks of length 128 and a remainder block 256 that is less than 128 bits long. The decryption module 258 operates in a first encryption mode for the standard block and in a second encryption mode for the remainder block with the residual bits. In particular, the decryption module 258 decrypts the 128 bit blocks via the base decryption algorithm, and employs a second algorithm, labeled, "decrypt-2" for the remainder block. As discussed in conjunction with FIG. 9, the encrypt-2 algorithms can be a simple pass through that leaves the residual/remainder block unencrypted. In this case, the decrypt-2 algorithm can also be a simple pass through that copies the encrypted bits in the residual block.

In the example presented in conjunction with FIG. 22 the group of bits 252 has fewer bits than the standard block size, i.e. a 128 bit block and is encrypted using algorithm decrypt-2. It should be noted that the above examples present one possible segmentation procedure for the group of bits 252. Other segmentations including the use of other block sizes could be employed—depending on the operation of bit stream segmenter 154.

Figure 23:
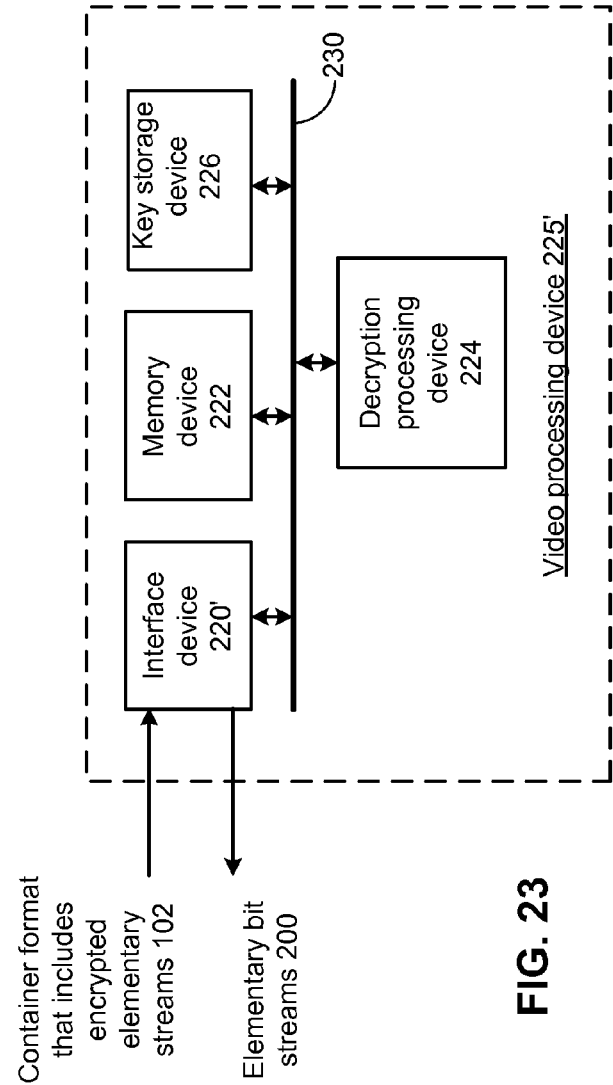
FIG. 23 presents a schematic block diagram representation of a video processing device 225' in accordance with an embodiment of the present invention.

FIG. 23 presents a schematic block diagram representation of a video processing device 225' in accordance with an embodiment of the present invention. In particular, a further embodiment of video processing device 225 is presented that includes several common functions and features that are referred to by common reference numerals. In this embodiment, the interface device 220' includes an interface module that de-encapsulates the encrypted elementary bit streams 102 from a container format such as PES, TS and/or IP.

Figure 24:
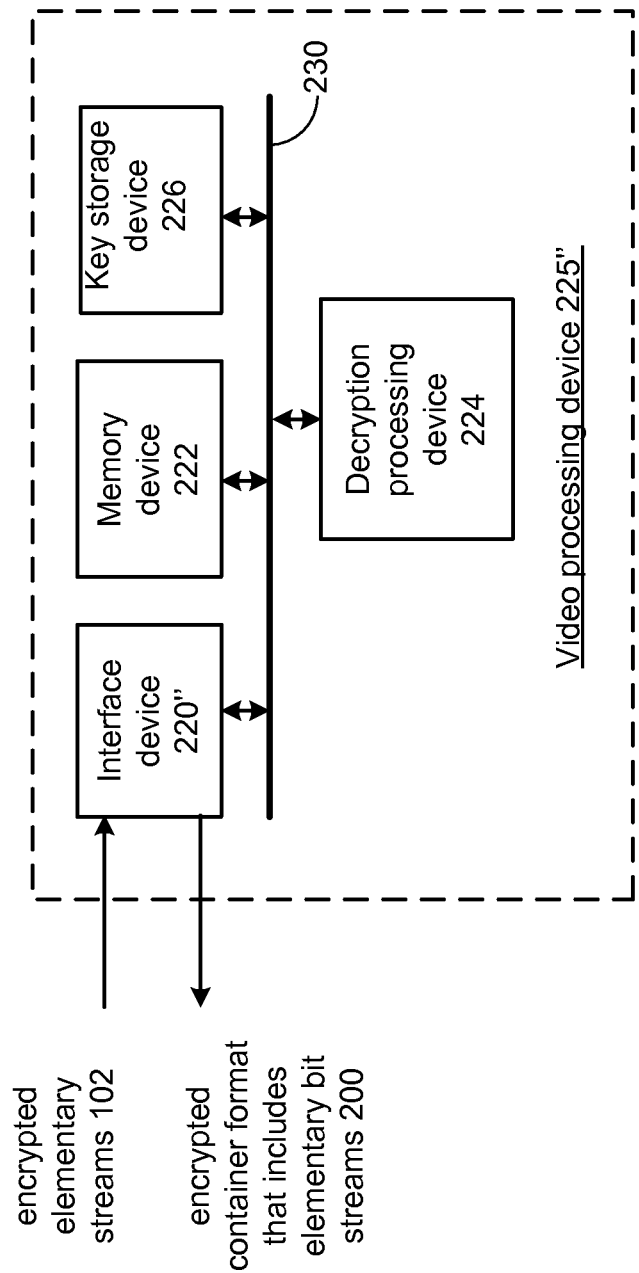
FIG. 24 presents a schematic block diagram representation of a video processing device 225" in accordance with an embodiment of the present invention.

FIG. 24 presents a schematic block diagram representation of a video processing device 225" in accordance with an embodiment of the present invention. In particular, a further embodiment of video processing device 225 is presented that includes several common functions and features that are referred to by common reference numerals. In this embodiment, the interface device 220" includes an interface module that generates a compressed video signal in an encrypted container format such as PES, TS or IP or other container format. The interface module of interface device 120" encrypts and encapsulates the elementary bit stream 200 after decryption for storage or transport. In this fashion, processing device 225" can produce video signals compatible with legacy devices that operate with conventional encrypted container formats.

Figure 25:
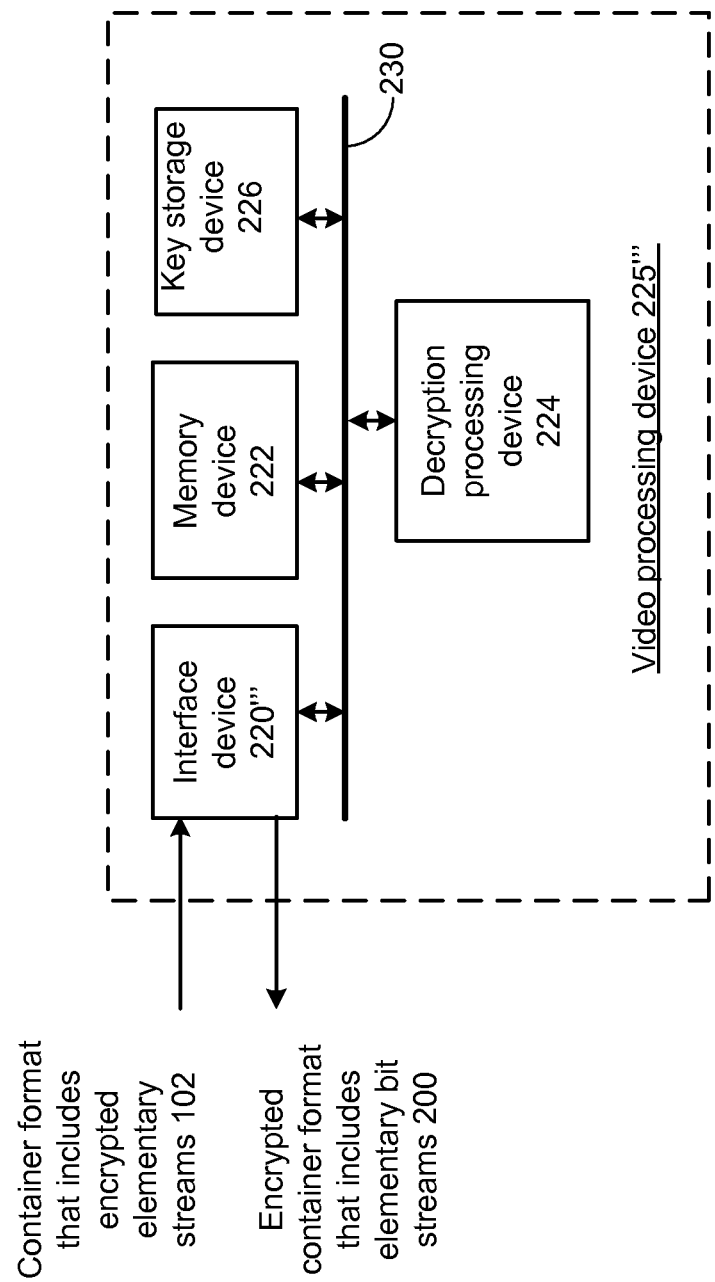
FIG. 25 presents a schematic block diagram representation of a video processing device 225''' in accordance with an embodiment of the present invention.

FIG. 25 presents a schematic block diagram representation of a video processing device 225'" in accordance with an embodiment of the present invention. In particular, a further embodiment of video processing device 225 is presented that includes several common functions and features that are referred to by common reference numerals. In this embodiment, the interface device 120'" includes a first interface module as described in conjunction with FIG. 23 that receives encrypted elementary streams 102 in a container format such as PES, TS or IP or other container format. This interface module of interface device 120" de-encapsulates the compressed video signal for decryption to produce the elementary bit stream 200.

In this embodiment, the interface device 120'" further includes a second interface module as described in conjunction with FIG. 10 that encapsulates or re-encapsulates and encrypts the elementary bit streams 200 in an encrypted container format such as PES, TS and/or IP for storage or transport. It should be noted that the input and output container formats may be the same format or different format, depending on the implementation.

It should be noted that video processing devices 125'" and 225'" operate to transcrypt an encrypted container format to and from an encrypted elementary bit stream. For example, such a transcryption device can receive encrypted content in one of the standard container formats (IP/TS/PES) which is protected by a conditional access (CA) or digital rights management (DRM). It will decrypt the protected content in its original container format then re-encrypt the content in ES format. The ES encrypted content may then be stored locally to a Hard Drive, used in a Trick Mode operation or transmitted to devices capable of decrypting the ES encrypted content. The converse is also possible i.e. ES encrypted content may be decrypted then re-encrypted into IP/TS/PES containers. Another option is to transcrypt ES encrypted content into ES encrypted content using a different or same key (perhaps operating on the ES content).

Figure 26:
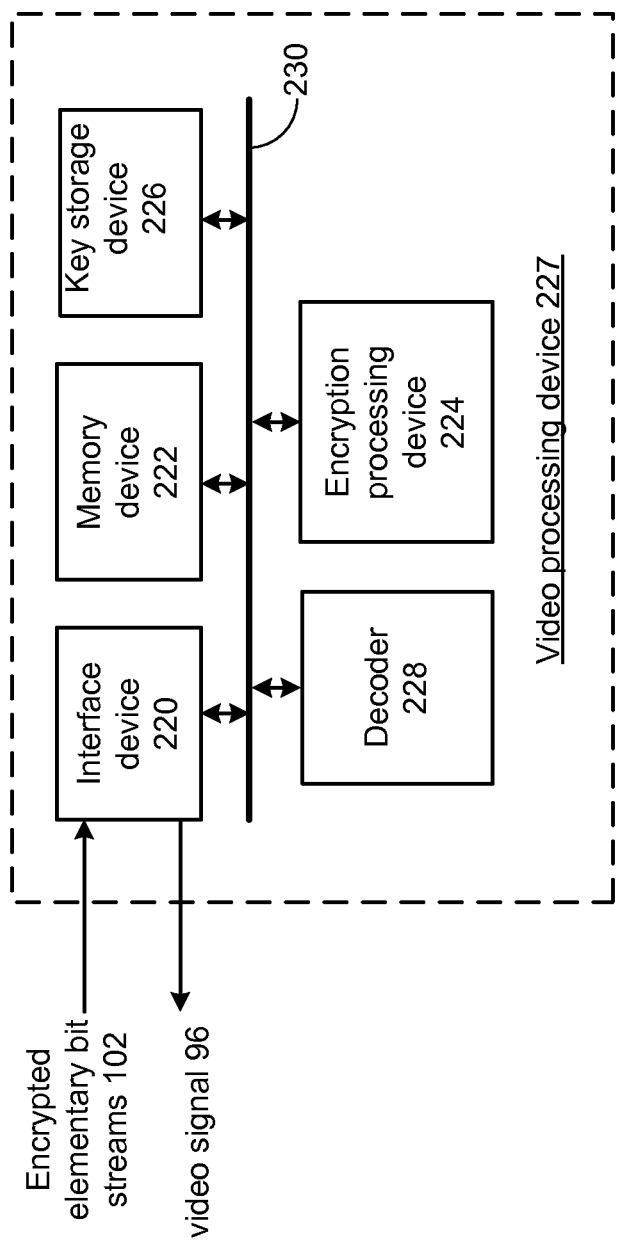
FIG. 26 presents a schematic block diagram representation of a video processing device 227 in accordance with an embodiment of the present invention.

FIG. 26 presents a schematic block diagram representation of a video processing device 227 in accordance with an embodiment of the present invention. In particular, a further embodiment of video processing device 225 is presented that includes several common functions and features that are referred to by common reference numerals. In addition, the video processing device 227 includes a decoder 228 for decoding the elementary bit streams 200 into an uncompressed video signal 96.

In an embodiment of the present invention, the video processing device 227 embeds the decryption operation within the decoder that operates at the ES level. For example, the video processing device 227 receives an encrypted elementary bit stream that is decrypted and decoded in a single atomic operation to produce an uncompressed video signal 96 in the form of clear un-compressed content formatted as YUV/PCM.

Figure 27:
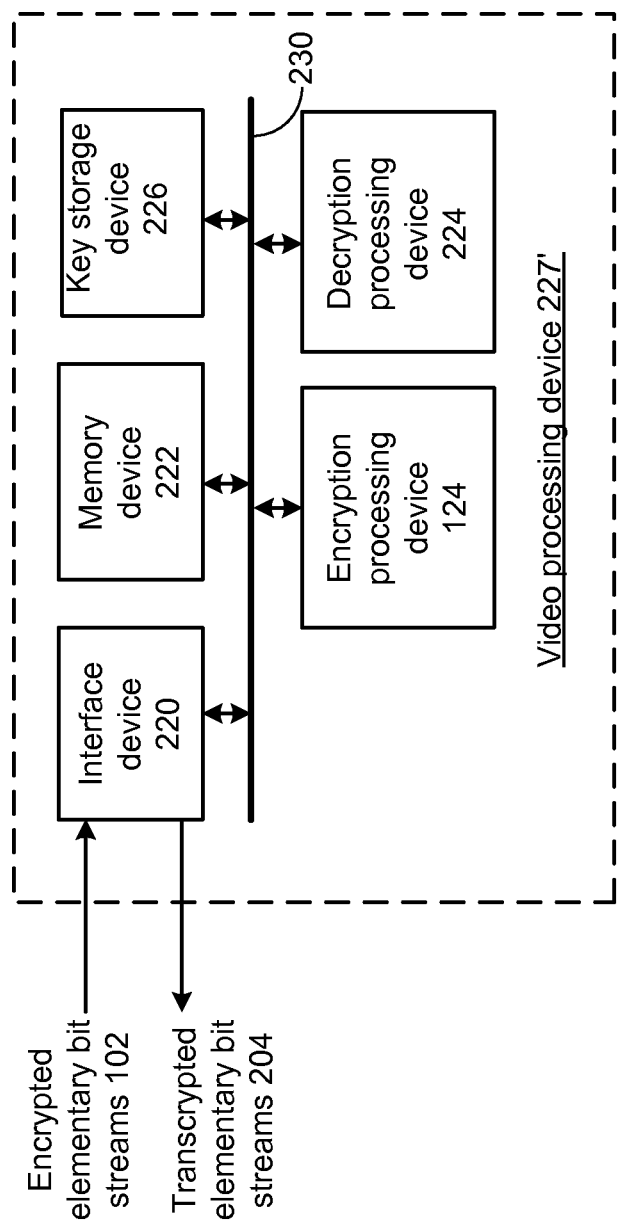
FIG. 27 presents a schematic block diagram representation of a video processing device 227' in accordance with an embodiment of the present invention.

FIG. 27 presents a schematic block diagram representation of a video processing device 227' in accordance with an embodiment of the present invention. In particular, a further embodiment of video processing device 225 is presented that includes several common functions and features that are referred to by common reference numerals. In addition, the video processing device 227' includes an encryption processing device 124 that retrieves at least one encryption key from the key storage device 226, and that directly encrypts the at least one elementary bit stream into a transcrypted elementary bit stream. In this fashion, a transcrypted elementary bit stream 204 can be produced from an encrypted elementary bit stream that is in the same elementary stream format, but is encrypted in a different encryption format or simply with a different encryption key.

Figure 28:
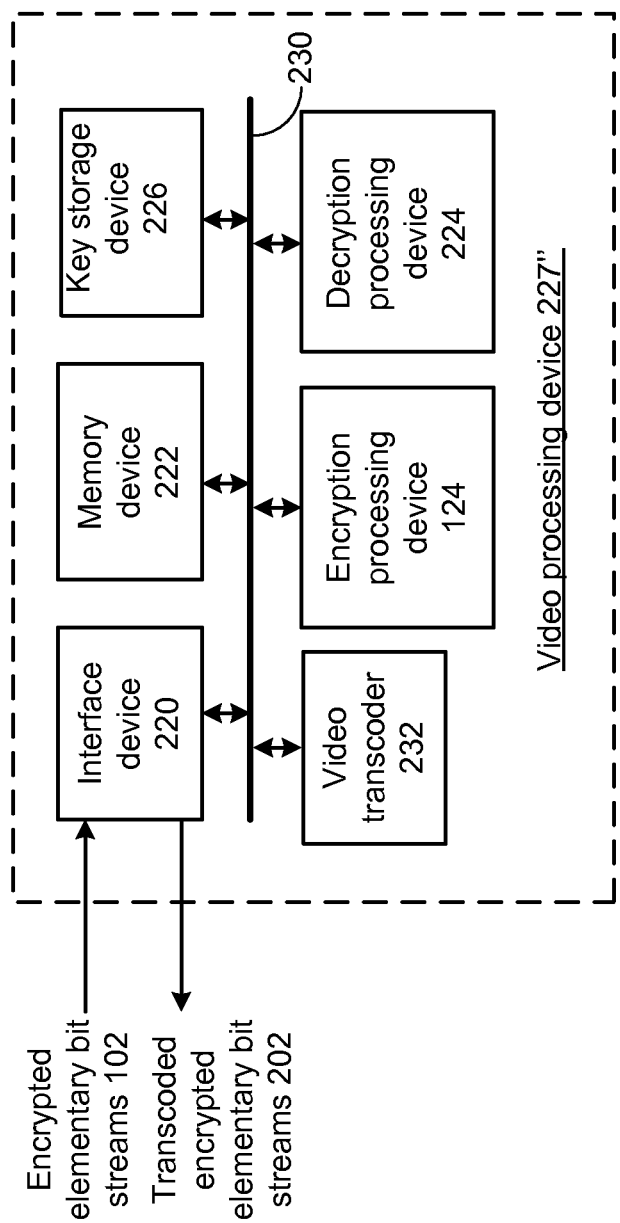
FIG. 28 presents a schematic block diagram representation of a video processing device 227" in accordance with an embodiment of the present invention.

FIG. 28 presents a schematic block diagram representation of a video processing device 227" in accordance with an embodiment of the present invention. In particular, a further embodiment of video processing device 227' is presented that includes several common functions and features that are referred to by common reference numerals. In addition, the video processing device 227" includes a transcoder 232 for transcoding the elementary bit streams 200 into a transcoded elementary bit stream 202 in a differing audio and/or video compression format. In operation, the encrypted elementary bit stream is decrypted by decryption processing device 224 into elementary bit stream 200. Transcoder 232 partially or fully decodes the elementary bit streams 200 to create a transcoded elementary bit stream. Encryption processing device 124 produces a transcoded encrypted elementary bit streams 202 from the transcoded elementary bit stream. It should be noted that the transcoded encrypted elementary bit streams 202 can be encrypted with the same key and encryption methodology as the encrypted elementary bit streams 102 or optionally, can be transcrypted to a new encryption methodology or using one or more new encryption keys.

In an embodiment of the present invention, the video processing device 227" embeds the encryption and decryption operations within the transcoder that operates at the ES level. For example, the video processing device 227" receives an encrypted elementary bit stream that is decrypted, transcoded and re-encrypted in a single atomic operation.

Figure 29:
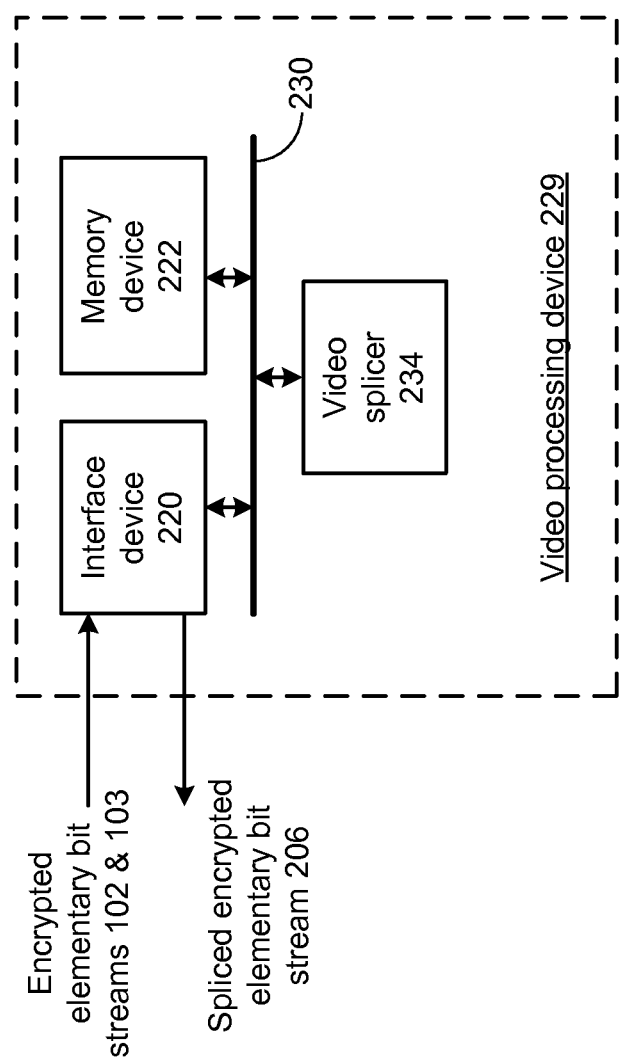
FIG. 29 presents a schematic block diagram representation of a video processing device 229 in accordance with an embodiment of the present invention.

FIG. 29 presents a schematic block diagram representation of a video processing device 229 in accordance with an embodiment of the present invention. In particular, video processing device 229 includes video splicer 234 that receives a plurality of encrypted elementary bit streams (102, 103, . . . ) that contain a corresponding plurality of video programs. The video splicer 234 splices the plurality of encrypted elementary bit streams (102, 103, . . . ) into a single combined encrypted elementary bit stream 206 containing a combined video program that is a concatenation of the corresponding plurality of video programs.

Due to the ability to view all framing information, the video splicer 234 can generate a combined ES encrypted stream without having to decrypt either of the input ES encrypted streams. Note that decryption and re-encryption may, never the less, be employed via optional inclusion of encryption processing device 124 and decryption processing device 224 to transcrypt one or the encrypted elementary bit streams (102, 103, . . . ) to match the encryption employed by other bit stream or streams or to transcrypt the combined encrypted elementary bit stream 206 with either the same or a different key.

FIG. 30 presents a flowchart representation of a method in accordance with an embodiment of the present invention. In particular, a method is presented for use in conjunction with one or more functions and features described in conjunction with FIGS. 1-29. In step 400, at least one encryption key is retrieved from a key storage device. In step 402, the at least one elementary bit stream is directly encrypted into at least one encrypted elementary bit stream.

In an embodiment of the present invention, step 402 operates without encrypting formatting data associated with at least one container format associated with the compressed video signal and without encrypting framing data associated with the compressed video signal. Step 402 can include parsing the at least one elementary bit stream parser to identifies a first start code sequence and a second start code sequence in the at least one elementary bit stream and further to identifies a group of bits between the first start code sequence and the second start code sequence, wherein the second start code sequence is the next start code sequence after the first start code sequence in a temporal ordering of the at least one elementary bit stream. The group of bits can be segmented into at least one block and the at least one block can be encrypted into at least one encrypted block based on the at least one encryption key. The at least one encrypted elementary bit stream can be generated from the at least one encrypted block.

Step 402 can also include testing the at least one encrypted block for an occurrence of a false start sequence. When the at least one encrypted block includes the false start sequence, iteratively encrypting the at least one block until the at least one encrypted block does not contain the false start sequence. The at least one block can includes at least one standard block of standard length and a remainder block that is not equal to the standard length. In this case, step 402 can include operating in a first encryption mode for the at least one standard block and a second encryption mode for the remainder block.

FIG. 31 presents a flowchart representation of a method in accordance with an embodiment of the present invention. In particular, a method is presented for use in conjunction with one or more functions and features described in conjunction with FIGS. 1-30 wherein the at least one elementary bit stream includes a plurality of elementary bit streams containing a corresponding plurality of video programs, and the at least one encrypted elementary bit stream includes a plurality of encrypted elementary bit streams containing the corresponding plurality of video programs. In step 410, the plurality of encrypted elementary bit streams are spliced into a single combined encrypted elementary bit stream containing a combined video programs that is a concatenation of the corresponding plurality of video programs.

Figure 32:
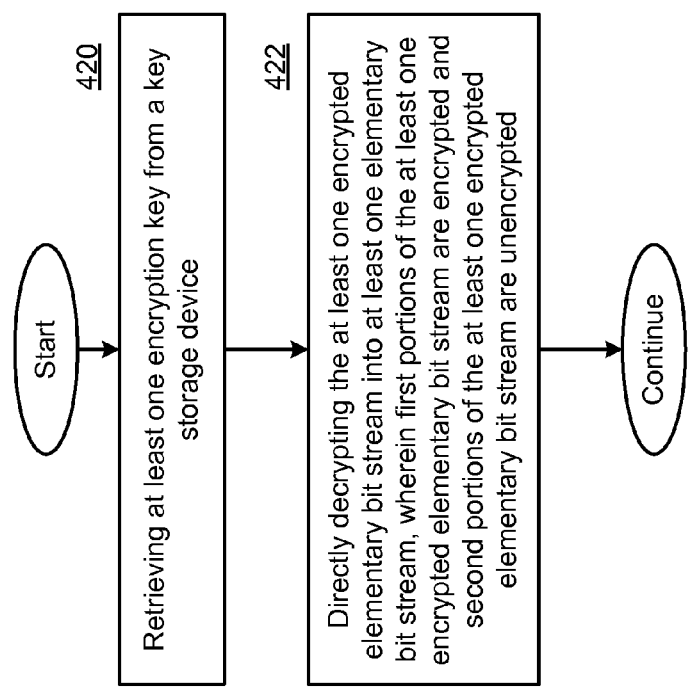
FIG. 32 presents a flowchart representation of a method in accordance with an embodiment of the present invention.

FIG. 32 presents a flowchart representation of a method in accordance with an embodiment of the present invention. In particular, a method is presented for use in conjunction with one or more functions and features described in conjunction with FIGS. 1-31. In step 420, at least one decryption key is retrieved from a key storage device. In step 422, at least one encrypted elementary bit stream is decrypted into at least one elementary bit stream, wherein first portions of the at least one encrypted elementary bit stream are encrypted and second portions of the at least one encrypted elementary bit stream are unencrypted.

In an embodiment of the present invention, step 422 includes: identifying a first start code sequence and a second start code sequence in the at least one encrypted elementary bit stream and further that identifying a group of bits between the first start code sequence and the second start code sequence, wherein the second start code sequence is the next start code sequence after the first start code sequence in a temporal ordering of the at least one encrypted elementary bit stream; segmenting the group of bits into at least one block; decrypting the at least one block into at least one decrypted block based on the at least one decryption key; and generating the at least one elementary bit stream from the at least one decrypted block.

The at least one block can includes at least one standard block of standard length and a remainder block that is not equal to the standard length and wherein decrypting the at least one block operates in a first decryption mode for the at least one standard block and a second decryption mode for the remainder block.

Step 422 can also include testing the at least one decrypted block for an occurrence of a false start sequence. When the at least one decrypted block includes the false start sequence, iteratively decrypting the at least one block until the at least one decrypted block does not contain the false start sequence.

Figure 33:
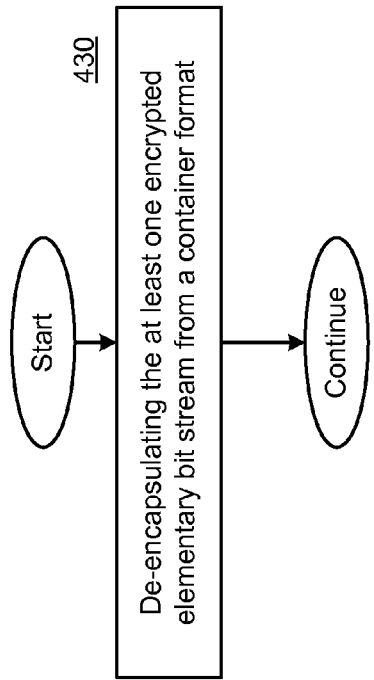
FIG. 33 presents a flowchart representation of a method in accordance with an embodiment of the present invention.

FIG. 33 presents a flowchart representation of a method in accordance with an embodiment of the present invention. In particular, a method is presented for use in conjunction with one or more functions and features described in conjunction with FIGS. 1-32. In step 430, the at least one encrypted elementary bit stream is de-encapsulated from a container format.

Figure 34:
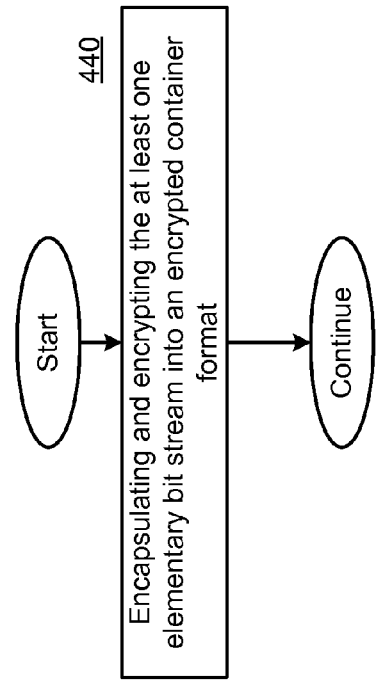
FIG. 34 presents a flowchart representation of a method in accordance with an embodiment of the present invention.

FIG. 34 presents a flowchart representation of a method in accordance with an embodiment of the present invention. In particular, a method is presented for use in conjunction with one or more functions and features described in conjunction with FIGS. 1-33. In step 440, the at least one elementary bit stream is encapsulated and encrypted into an encrypted container format.

There are many possible applications of the embodiment described in conjunction with FIGS. 1-32. Raw YUV and PCM samples can be encoded using various A/V codec(s) and the ES is encrypted as part of the encode pipeline for distribution, transport, storage or other processing. The A/V encrypted and encoded ES can be decrypted and decoded to raw YUV and PCM samples as part of the decode pipeline. A/V content encrypted using one of the existing container formats (IP/TS/PES) can be decrypted then re-encrypted using the encrypted ES format. ES encrypted A/V content can be decrypted then re-encrypted to one of the existing container formats (IP/TS/PES). ES Encrypted A/V content can be stored on a Hard Disk to facilitate a PVR application because header and framing information can be accessed without having to decrypt the content. Multiple Encrypted A/V ES can be spliced seamlessly by a slicing application because timing and framing information can be accessed without having to decrypt the content. ES Encrypted A/V content can be stored in memory and a trick mode application is facilitated because header and framing information can be accessed without having to decrypt the content. ES Encrypted A/V content can be stored in memory or on disk and a streaming application is facilitated because header, framing and timing information can be accessed without having to decrypt the content. Also the device being streamed to has lower memory and processing requirements and results in a more secure end to end delivery of content. ES Encrypted A/V content is compatible with existing CA and DRM systems in that the CA and DRM Key exchange and Rights management mechanism(s) may remain unchanged with the key typically used to decrypt the A/V content in (IP/TS/PES) container form used to encrypt/decrypt the A/V content at the ES level.

The encrypted elementary bit streams described herein can be used in conjunction with one or more networks or other connections such as the Internet, another wide area network, broadband wireless or terrestrial networks such as satellite, cable, cellular, or telephone company networks, or other public or private networks. Any of the video processing devices described herein can be employed at any point in a content generation and deliver system from a content source, to one or more content delivery servers or headends, cloud devices, edge devices or other network devices, home gateways, set top boxes, and client devices, either fixed or mobile. More particularly, the client devices can be set top boxes, televisions, personal computers, smart phones, internet tablets or other client devices that receive content originating from a content source.

One aspect of the security improvement associated with ES encryption is that low level operations may be performed atomically in a single device. In this fashion, a decoder can perform an atomic Read/Decrypt/Decode/Write to Memory operation, an encoder can perform an atomic Read/Encode/Encrypt/Write to Memory operation, a transcoder can perform a Read from Memory/Decrypt/Transcode/Encrypt/Write to Memory operation, etc. This addresses a fundamental security weakness in modern security devices which decode, encode or transcode encrypted A/V content. There are several implementations for ES encryption atomicity. One implementation employs a hardware engine that securely encrypts an elementary bit stream that is written to a shared memory. The ES data is read from the processor's cache memory and encrypted. Similarly, a hardware engine can be implemented to securely decrypt an elementary bit stream that is read from shared memory, decrypted and written into a processor's cache memory. These approaches would be appropriate for Audio ES decryption/encryption since this is typically performed by and audio DSP. This would block other processors within the system from having access to the decrypted ES content. A more sophisticated mechanism would involve adding H/W mechanisms which read/writes encrypted ES content from/to a shared memory, securely perform the decryption/encryption and passes the clear ES content to/from the H/W Decoder/Encoder/Transcoder via a shared internal buffer. This would also block other processors within the system from having access to the decrypted ES content.

Various embodiments described in conjunction with FIGS. 1-32 reduces memory utilization and bandwidth because the content encryption/decryption is embedded within the encode/decode codec there is no need for additional memory buffers (i.e. reduces memory utilization) and there are fewer read/write operation (i.e. reduced memory bandwidth). The security risk is reduced because the clear compressed content never resides in memory (i.e. the decryption/decode operations are handled atomically within the A/V Codec's). Latency can be reduced because the content is encrypted/decrypted at the ES level embedded within the A/V encode/decode codec's there is no need for additional handling of the content and thus there is far less latency and s/w overhead involved. Hardware requirements can be reduced because the content is encrypted/decrypted at the ES level and is embedded within the A/V encode/decode codec's there is less additional hardware required (i.e. there is no need for complete separate encryption/decryption components). The ES encrypted compressed content can be parsed and used directly in a trick mode application because all the framing information is available. The ES encrypted compressed content may be securely stored on Hard Disk and can be parsed and s/w can seek through files, the encrypted content may be used directly in PVR applications because all the framing information is available.

The ES encrypted compressed content can be sent to $3^{rd}$ party devices, and because the decryption occurs within the codec, the clear compressed content is not exposed in memory. The ES encrypted compressed content can be parsed to determine appropriate splice points and so it is relatively simple to splice ES encrypted streams without having to decrypt them.

Figure 35:
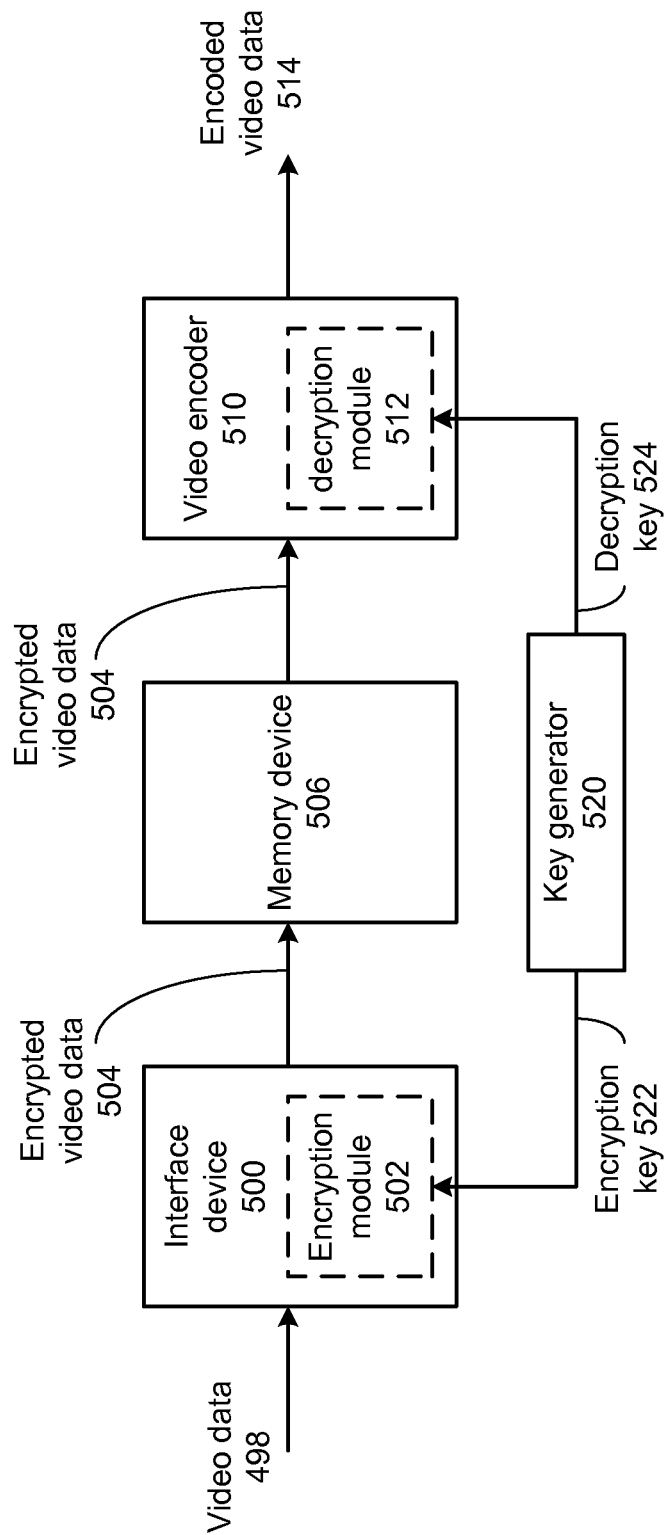
FIG. 35 presents a schematic block diagram representation of a video processing device in accordance with an embodiment of the present invention.

FIG. 35 presents a schematic block diagram representation of a video processing device in accordance with an embodiment of the present invention. A video processing device is presented for processing video data 498. Like selected embodiments described in conjunction with FIGS. 1-34, this video processing device protects the security of data via encryption when it is stored on a memory device 506 during processing. In particular, memory input/output (I/O) includes encryption and decryption as part of an atomic operation to receive uncompressed video data 498 and to generate encoded video data 514.

A key generator 520 generates or otherwise stores and retrieves an encryption key 522 and a decryption key 524. An interface device 500 receives the video data 498 in a media format and automatically encrypts the video data 498 via encryption module 502 into encrypted video data 504 based on the encryption key 522 and stores the encrypted video data 504 in the memory device 506. A video encoder 510 automatically decrypts the encrypted video data 504, via decryption module 512 based on the corresponding decryption key 524 when retrieving the video data from the memory device 506 in conjunction with an encoding of the video signal into encoded video data 514.

The video data 498 can include digital audio data. In particular, the media format of the video data 498 can high-definition multimedia interface (HDMI) formatted data, International Telecommunications Union recommendation BT.656 formatted data, inter-integrated circuit sound (I2S) formatted data, and/or other digital A/V data formats.

In an embodiment of the present invention, memory device 506 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. The key generator 520 can be implemented as part of or separate from the memory device 506.

The interface device 500 and video encoder 510 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 36:
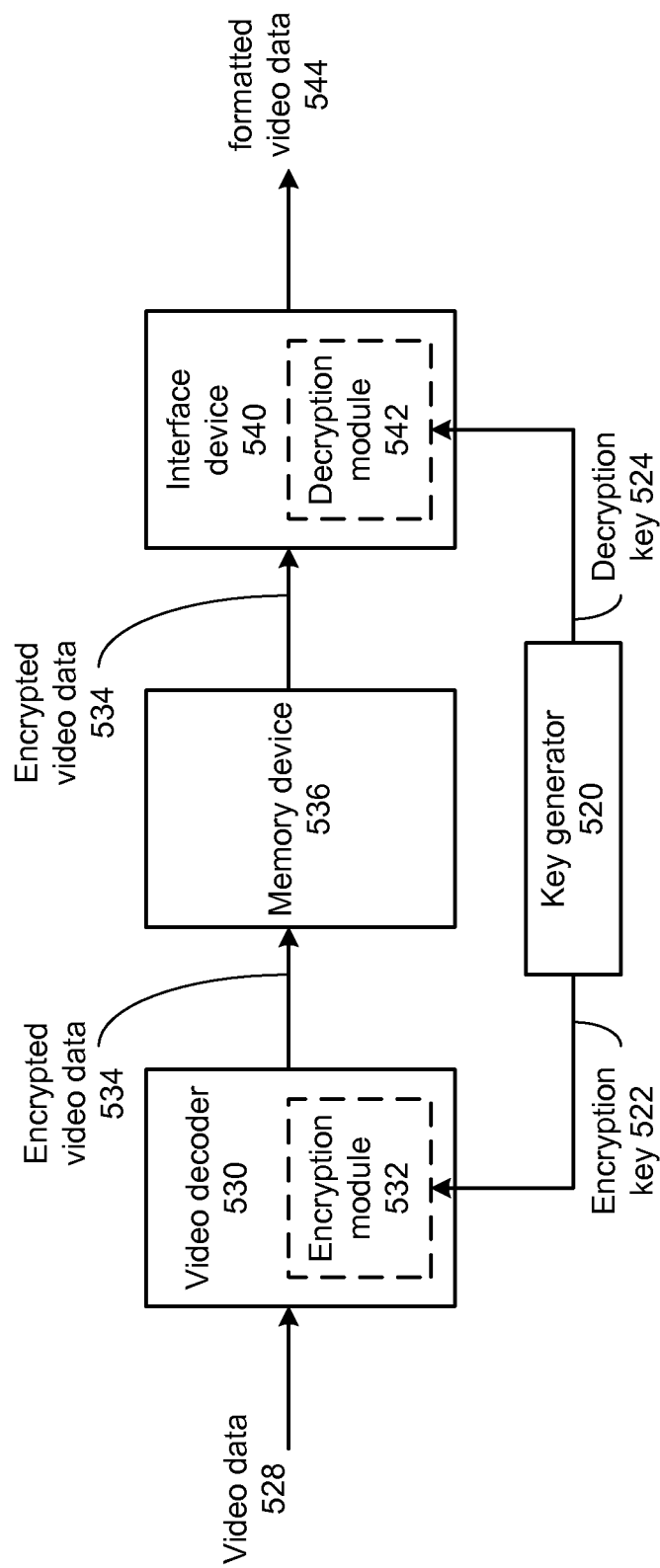
FIG. 36 presents a schematic block diagram representation of a video processing device in accordance with an embodiment of the present invention.

FIG. 36 presents a schematic block diagram representation of a video processing device in accordance with an embodiment of the present invention. A video processing device is presented for processing video data 528. Like selected embodiments described in conjunction with FIG. 35, this video processing device protects the security of data via encryption when it is stored on a memory device 536 during processing. In particular, memory input/output (I/O) includes encryption and decryption as part of an atomic operation to receive encoded video data 528 and to generate decoded and formatted video data 544.

The video processing device includes a key generator 520 for generating an encryption key and a corresponding decryption key. A video decoder 530 decodes the video data, automatically encrypts the decoded video data via encryption module 532 into encrypted video data 534 based on the encryption key 522 and stores the encrypted video data in the memory device 536. An interface device 540 automatically decrypts the encrypted video data 534 via decryption module 542, based on the corresponding decryption key 524 when retrieving the encrypted video data 534 from the memory device 536 in conjunction with formatting the video data in a media format.

The formatted video data 544 can include digital audio data. In particular, the media format of the formatted video data 544 can high-definition multimedia interface (HDMI) formatted data, International Telecommunications Union recommendation BT.656 formatted data, inter-integrated circuit sound (I2S) formatted data, and/or other digital A/V data formats.

In an embodiment of the present invention, memory device 536 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. The key generator 520 can be implemented as part of or separate from the memory device 536.

The interface device 540 and video decoder 530 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

FIG. 37 presents a flowchart representation of a method in accordance with an embodiment of the present invention. In particular, a method is presented for use in conjunction with one or more functions and features described in conjunction with FIGS. 1-34. In step 600, an encryption key and a corresponding decryption key are generated. In step 602, the video data is received in a media format via an interface device. In step 604, the video data are automatically encrypted into encrypted video data based on the encryption key when the unencrypted video data is received via the interface device, and storing the encrypted video data in a memory device. In step 606, the encrypted video data are automatically decrypted based on the corresponding decryption key when retrieving the video data from the memory device in conjunction with an encoding of the video signal by a video encoder.

The video data can include digital audio data. In particular, the media format of the video data can be high-definition multimedia interface (HDMI) formatted data, International Telecommunications Union recommendation BT.656 formatted data, inter-integrated circuit sound (I2S) formatted data, and/or other digital A/V data formats.

FIG. 38 presents a flowchart representation of a method in accordance with an embodiment of the present invention. In particular, a method is presented for use in conjunction with one or more functions and features described in conjunction with FIGS. 1-34. In step 610, an encryption key and a corresponding decryption key are generated. In step 612, the video data are decoded via a video decoder. In step 614, the decoded video data are automatically encrypted into encrypted video data based on the encryption key when the unencrypted video data is decoded via the video decoder, and the encrypted video data are stored in a memory device. In step 616, the encrypted video data are automatically decrypted based on the corresponding decryption key when retrieving the video data from the memory device in conjunction with a formatting of the video signal in a media format via an interface device.

The formatted video data can include digital audio data. In particular, the media format of the formatted video data can high-definition multimedia interface (HDMI) formatted data, International Telecommunications Union recommendation BT.656 formatted data, inter-integrated circuit sound (I2S) formatted data, and/or other digital A/V data formats.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A video processing device for decrypting a compressed video signal from at least one partially encrypted elementary bit stream, the video processing device comprising:
a machine that includes:
 a key storage device for storing at least one decryption key; and
 a decryption processing device, coupled to the key storage device, that retrieves the at least one decryption key from the key storage device, that segments the at least one partially encrypted elementary bit stream into a plurality of blocks, wherein segmenting the plurality of blocks includes separating the plurality of blocks into a first subset of blocks of standard length and a second subset of blocks of non-standard length, and that decrypts at least one partially encrypted elementary bit stream into a decrypted elementary bit stream, by applying a first of a plurality of decryption methods for decrypting each of the first subset of blocks of standard length and applying a second of the plurality of decryption methods for decrypting each of the second subset of blocks of non-standard length separately from the first subset of blocks of standard length;
wherein first portions of the at least one partially encrypted elementary bit stream are encrypted and second portions of the at least one partially encrypted elementary bit stream are unencrypted.

2. The video processing device of claim 1 wherein the decryption processing device includes:
a decryption module, coupled to the bit stream segmenter, that decrypts the plurality of blocks into a plurality of decrypted blocks based on the at least one decryption key; and
an output formatter, coupled to the decryption module, that generates the decrypted elementary bit stream from the plurality of decrypted blocks.

3. The video processing device of claim 1 wherein the second subset of blocks includes a remainder block.

4. The video processing device of claim 1 wherein the decrypted elementary bit stream includes an elementary audio bit stream and an elementary video bit stream.

5. The video processing device of claim 1 further comprising:
an interface module, coupled to the decryption processing device, that de-encapsulates the at least one partially encrypted elementary bit stream from a container format.

6. The video processing device of claim 1 further comprising:
an interface module, coupled to the decryption processing device, that encapsulates and encrypts the decrypted elementary bit stream into an encrypted container format.

7. The video processing device of claim 1 further comprising:
a video decoder, coupled to the decryption processing device, that decodes the decrypted elementary bit stream to produce an uncompressed video signal.

8. The video processing device of claim 1 further comprising:
an encryption processing device, coupled to the key storage device, that retrieves at least one encryption key from the key storage device, and that encrypts the decrypted elementary bit stream into a transcrypted elementary bit stream.

9. The video processing device of claim 1 further comprising:
a video transcoder, coupled to the decryption processing device, that transcodes the decrypted elementary bit stream to produce at least one transcoded elementary bit stream.

10. The video processing device of claim 9 further comprising:
an encryption processing device, coupled to the video transcoder, that retrieves at least one encryption key from the key storage device and that encrypts the at least one transcoded elementary bit stream into a transcoded encrypted elementary bit stream.

11. A method for decrypting a compressed video signal from at least one partially encrypted elementary bit stream, the method comprising:
a machine that includes:
  storing at least one decryption key in a key storage device; and
  executing instructions via a processor to:
    retrieve the at least one decryption key from the key storage device;
    segment the at least one partially encrypted elementary bit stream into a plurality of blocks, wherein segmenting the plurality of blocks includes separating the plurality of blocks into a first subset of blocks of standard length and a second subset of blocks of non-standard length; and
    decrypt at least one partially encrypted elementary bit stream into a decrypted elementary bit stream, by applying a first of a plurality of decryption methods for decrypting each of the first subset of blocks of standard length and applying a second of the plurality of decryption methods for decrypting each of the second subset of blocks of non-standard length separately from the first subset of blocks of standard length;
    wherein first portions of the at least one partially encrypted elementary bit stream are encrypted and second portions of the at least one partially encrypted elementary bit stream are unencrypted.

12. The method of claim 11 wherein decrypting the at least one partially encrypted elementary bit stream includes:
  decrypting the plurality of blocks into a plurality of decrypted blocks based on the at least one decryption key; and
  generating the decrypted elementary bit stream from the plurality of decrypted blocks.

13. The method of claim 12 wherein the second subset of blocks includes a remainder block.

14. The method of claim 11 wherein the decrypted elementary bit stream includes an elementary audio bit stream and an elementary video bit stream.

15. The method of claim 11 further comprising:
  de-encapsulating the at least one partially encrypted elementary bit stream from a container format.

16. The method of claim 11 further comprising:
  encapsulating and encrypting the decrypted elementary bit stream into an encrypted container format.

17. The method of claim 11 further comprising:
  decodes the decrypted elementary bit stream to produce an uncompressed video signal.

18. The method of claim 11 further comprising:
  retrieving at least one encryption key from the key storage device; and
  encrypting the decrypted elementary bit stream into a transcrypted elementary bit stream.

19. The method of claim 11 further comprising:
  transcoding the decrypted elementary bit stream to produce at least one transcoded elementary bit stream.

20. The method of claim 19 further comprising:
  retrieving at least one encryption key from the key storage device; and
  encrypting the at least one transcoded elementary bit stream into a transcoded encrypted elementary bit stream.

* * * * *